United States Patent
McQueen et al.

(10) Patent No.: US 6,729,603 B1
(45) Date of Patent: May 4, 2004

(54) ADD-ON CAPTURE RATE IN A BARCODE SCANNING SYSTEM

(75) Inventors: Alexander M. McQueen, Eugene, OR (US); Craig D. Cherry, Eugene, OR (US); Randy J. Turkal, St. Clairsville, OH (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 10/162,527

(22) Filed: Jun. 3, 2002

Related U.S. Application Data

(60) Provisional application No. 60/297,083, filed on Jun. 8, 2001.

(51) Int. Cl.[7] ................................................. G06K 7/10
(52) U.S. Cl. ............. 235/375; 235/462.07; 235/462.12; 235/470
(58) Field of Search ........................... 235/375, 462.12, 235/436, 462.08, 494, 462.07, 462.25, 462.11, 462.18, 462.16, 470

(56) References Cited

U.S. PATENT DOCUMENTS

| | | | |
|---|---|---|---|
| 4,963,719 A | 10/1990 | Brooks et al. | 235/462 |
| 5,128,527 A | * 7/1992 | Kawai et al. | 235/462.07 |
| 5,198,649 A | 3/1993 | Brooks | 235/462 |
| 5,311,000 A | 5/1994 | Brooks | 235/462 |
| 5,440,110 A | 8/1995 | Brooks | 235/462 |
| 5,493,108 A | 2/1996 | Cherry et al. | 235/454 |
| 5,686,715 A | * 11/1997 | Watanabe et al. | 235/436 |
| 5,929,421 A | 7/1999 | Cherry et al. | 235/462 |
| 6,158,660 A | 12/2000 | Blanford et al. | 235/462 |
| 2003/0094494 A1 | 5/2003 | Blanford et al. | 235/462.07 |

FOREIGN PATENT DOCUMENTS

| | | | | |
|---|---|---|---|---|
| JP | 04277887 | * 10/1992 | | G06K/7/10 |
| JP | 2001243416 | * 9/2001 | | G06K/7/10 |

* cited by examiner

*Primary Examiner*—Thien M. Le
*Assistant Examiner*—Edwyn Labaze
(74) *Attorney, Agent, or Firm*—Stoel Rives LLP

(57) ABSTRACT

A scanner system and method for improving the capture rate of reading labels with add-ons without sacrificing throughput with respect to non-add-on labels, the scanner including a mode in which the scanner "learns" over time which base label codes will have associated add-ons. At first, the required number of reads of base label information is set to a programmable number that is very low, and is preferably one. As the scanner successfully reads both a base label and its add-on data, the base label data is stored in a list in the scanner's memory and the required number of reads of this particular base label is increased to a second programmable number which is higher than the first and preferably high enough to obtain a reasonable add-on capture rate. Future scans of a base label corresponding to that of one in the list store will result in additional read attempts to ensure the capture of add-on information while the initial low number of reads remains in tact with respect to non-add-on labels. Thus, first pass read rate is preserved where possible and throughput is optimized. Base label statistics on successful base label and associated add-on reads, as well as ordering and selective storage of base label information based on frequency of base label occurrence may also be provided to further optimize performance while reducing system requirements.

34 Claims, 10 Drawing Sheets

ADD-ON CAPTURE RATE IN A BARCODE SCANNING SYSTEM

BACKGROUND OF THE INVENTION

This application claims priority to provisional application Ser. No. 60/297,083 filed Jun. 8, 2001 hereby incorporated by reference.

BACKGROUND

The field of the present invention relates to data reading devices, such as barcode scanners and other barcode reading devices. In particular, barcode readers are described herein which employ methods whereby the capture rate of reading labels with add-ons is improved without sacrificing throughput with respect to non-add-on labels.

Barcode labels encode information in a variety of formats, i.e., symbologies, and are commonly employed in applications such as inventory control systems and, most familiarly, affixed to consumer goods for retail store check-out, among others. Typically, the information encoded on each label uniquely identifies the product or product line. Such information, once decoded, may be used to identify other information, e.g., price, associated with the labeled object.

A barcode label typically comprises a series of parallel dark bars of varying widths with intervening fight spaces, also of varying widths. Character information (which can, e.g., be alpha-numeric) is encoded in the labels by the specific sequence of bars and spaces with groupings of bars and spaces representing the character information. The precise nature of the representation depends on the particular barcode symbology in use.

One traditional symbology is the Universal Product Code (UPC) label in which each character is made up of two bars and two interleaved spaces. The width of each character is measured in units called "modules" with each character being seven modules in width. The width of any particular bar or space within the character representation is between one and four modules. The character value depends on the relative width in modules of the two bars and two spaces it comprises. For example, indicating bars with a 1 and spaces with a 0, a sequence of 111 would represent a bar that is three modules in width. The character value 5 may be represented as 0110001, i.e., one space that is 1 module in width, one bar that is 2 modules in width, one space that is 3 modules in width, and one bar that is one module in width, respectively. Likewise, the character 3 may be represented as 0111101.

With respect to the UPC label symbology alone there are many variations, such as UPC-A, UPC-E, etc. With the exception of UPC-E labels, the UPC symbologies comprise right and left segment halves. In addition to the UPC formats, a variety of other label formats exist which vary, among other ways, in structure, content, parity requirements, and type of feature characters. Code 39 and Code 128, for example are both non-segmented label formats, i.e., they have no center feature characters separating two or more segments of bars. Furthermore, many new label encoding schemes have been developed which have differing pattern structures for the dark and light areas. Exemplary of these newer code types are the stacked bar code formats referred to as Code 49 and PDF 417.

As indicated previously, with respect to the traditional symbologies such as UPC, the character information encoded in the barcode is represented by the specific sequence of bar and space widths. In addition to data characters, many labels utilize feature characters such as center or guard characters, as delimiters or to separate segments of the label. Most UPC labels, as noted above, have left and right segment halves. These segment halves are separated by a center band character that typically comprises two single module bars and three interleaved single module spaces. The beginning and end of the label are delimited by a pair of guard characters, each of which typically comprises two single module bars and one interleaved, single module space. The bar/space representations of these feature characters are unique from that of data characters to enhance detection and decoding capability. Furthermore, an unprinted margin area or white space is typically located outwardly of the two guard characters. In a further variation, a typical UPC/EAN barcode may or may not also include an additional piece of information in the form of a second, adjacent barcode called an "add-on" located beyond the white space margin beyond the end guard character.

Optical scanning systems and other data reading systems, e.g., barcode readers, use various devices and methods for the purpose of reading such labels, identifying the particular label format, and decoding the information stored in the label. Common types of barcode readers include spot scanners and line scanners. In either case, one or more light sources, such as a laser or laser diode, are utilized to scan the label with a collection subsystem detecting at least a portion of the light reflected from the label, distinguishing between dark and light areas, and converting the optical information into an electronic signal that may be recognized by a computer or other electronic system.

In spot scanners, a reading spot is systematically moved across the barcode, either manually or automatically. The resultant paths followed by the scanned illumination beam are typically referred to as a scan lines. A photodetector monitors the reflected or back-scattered light from each scan line. The photodetector may generate a high current when a large amount of light scattered from the barcode impinges on the detector, as from a light space, and likewise may produce a lower current when a small amount of light scattered from the barcode impinges on the photodetector, as from a dark bar.

With respect to line scanner systems, the barcode is focused onto a multi-element linear or areal photodetector array and the image of the barcode is detected. Though some imaging systems employ ambient light to illuminate the barcode, a light, source may also illuminate the barcode to provide the required signal response corresponding to the image. The imaging optics which produce an image of the barcode on the photodetector array can alternatively be thought of as projecting an image of the photodetector array (a "virtual scan line") into the scan volume in a manner completely analogous to the real scan line produced by a spot scanner. Further, scan pattern generating optics may be used to project multiple virtual scan lines into the scan volume in various directions and at varying orientations, thereby generating a virtual scan pattern, once again completely analogous to the real scan pattern produced by a spot scanner. Such a virtual scan line system is disclosed in U.S. Pat. No. 5,446,271 hereby incorporated by reference.

Regardless of which type of barcode reader is used, a raw electronic signal is generated from which the relative widths of the bars and spaces must be extracted. The electronic signal that is generated typically comprises a signal wherein voltage alternates between two preset voltage levels, one representative of the dark bars and the other representative of the light spaces. The temporal widths of these alternating pulses of high and low voltage levels correspond to the spatial widths of the bars and spaces. High-to-low or lowto-high transitions in the electronic signal voltage, representing edges of the bars and spaces (i.e., elements) in the barcode, may be detected by any of a number of means well known in the art. A common and well-known technique for edge detection is through the use of a derivative based signal processor such as is described by example in U.S. Pat. No. 4,000,397 entitled "Signal Processor Method and Apparatus" issued in the name of Hebert et al. and owned by the owner of the present application, which patent is hereby incorporated by reference as if fully set forth herein. The temporal sequence of alternating voltage pulses of varying widths comprising the electronic signal is then presented to an electronic decoding apparatus for decoding of the information encoded in the barcode.

As a practical matter, recovering information from optical code labels poses many difficulties that must be overcome by a scanning system. For example, in order to read a label completely, i.e., from left guard character or margin to right guard character or margin, in a single optical pass, the label must be properly oriented with respect to the scanning beam. Early prior art scanner systems depended upon individual scan lines extending across the entire barcode for the barcode to be successfully read. Failure to read in a single pass in such systems would require the object to be re-positioned and re-scanned until a successful read was obtained. These systems presented difficulties and inefficiencies in real-time, practical applications wherein the orientation of a barcode vis-a-vis the scanner was hard to control.

Even where a label is not scanned completely in a single read, the typical thirty to forty scans of the label generated from an omnidirectional scanning system typically provide some partial label information in each of multiple scan lines. Present systems incorporate specialized piecing mechanisms, comprising software or electronics, that have been developed and are capable of taking partial portions of barcodes and assembling them into a complete code, a process commonly known as stitching. Further details regarding exemplary stitching methods and systems may be found in U.S. Pat. No. 5,493,108, entitled "Method and Apparatus for Recognizing and Assembling Optical Code Labels" and issued in the name of inventors Craig D. Cherry and Donald D. Dieball, which patent is owned by the owner of the present application and is hereby incorporated by reference as if fully set forth herein.

As indicated previously, a typical UPC/EAN barcode, as well as certain other symbologies, may or may not include an additional piece of information in the form of a second, adjacent barcode called an "add-on". In the case where an optional add-on is present, it typically provides information that is supplemental, though generally not critical, to that provided in the base label alone. For example, with respect to retail goods, a typical base label (with or without add-on) may contain information regarding a manufacturer and the item identifier. This information, once decoded, may be used to look up and register price information, to adjust inventory quantities, etc. The add-on label may provide additional detailed information that may be used for inventory, statistical tracking, and other reasons. For example, with respect to periodical materials, the add-on may provide information regarding volume numbers, months, etc. Similarly, with respect to greeting cards, an add-on may provide seasonal references.

Whether or not an add-on does accompany a particular label, the general structure of the base label itself remains defined by the particular symbology. That is, for example, a UPC base label has the same general structure whether or not an add-on is present (i.e., start and end characters with the same characteristics, center characters with the same characteristics where applicable, the same number of data characters defined by the same relationships, etc.). Scanning systems typically use such symbology characteristics to identify when a valid read of label information has been obtained. There is typically no separate character or characteristic within a base label to indicate that an add-on is present.

Since the scanner typically does not "know" whether or not an add-on portion is present with respect to a particular label being scanned, it is possible that the scanner could read the appropriate number and position for start, end, center and data characters in a base label and think that it has identified a complete label. Thus, should a scan line(s) cross the base label portion without crossing the add-on portion, the system may decode the base label portion and assume that the complete label has been decoded. Indeed, even where partial scans of the label are stitched together, the possibility may exist that the add-on portion of the label is missed while the base label information is pieced together from multiple scans.

The capability of an omnidirectional barcode scanner to capture both the "base", e.g., standard UPC/EAN 12/13 digit code, along with the add-on is degraded by the random nature of the label crossing the various scan lines; for example, the label may be mis-framed and/or read diagonally across the base label portion without the add-on portion being scanned. In such cases, data from the add-on portion may be missed entirely on one or more scans of the label. In short, there is no guarantee that both the base and add-on portions of the label will scanned successfully in any one pass of the labeled item past the scanner, let alone in the first pass. This is particularly problematic since a primary goal of a scanner system is to achieve a high first pass read rate with optimum throughput.

The above situation presents a conflict for scanner system designers. On the one hand, if it is desired to capture the add-on data reliably with the base label data, then the scanner must not consider that the scanning task for a particular label is finished until it has a high degree of confidence that no add-on data exists with that label. On the other hand, if it is desired to have the optimal read rate for labels, then the scanner preferably accepts labels once they are successfully read without requiring further scanning to search for an add-on that may not exist.

In the past, scanner designers have identified two primary techniques in an attempt to address this conflict.

In one technique, a programmable number of extra base label reads is utilized under the assumption that if the number of reads of the base label is increased, then the chances that add-on information would show up in at least one read is increased. Of course, the disadvantage to this technique lies in the fact that it sacrifices any possibility for a successful first pass read rate for labels without add-ons present. If the number of reads required is increased from one, first pass read rate, and thus overall system throughput, degrades rapidly for all non-add-on labels.

In another technique that has been used, a programmable mode looks for specific data in the base label that may be associated with an add-on label. The disadvantage of this technique is that all base label data for any labels which incorporate an add-on must be programmed into the scanner before installation or must be configured in the scanner by the customer through programming labels or an interface connection. While the scanner can be programmed with this information, it does require significant additional memory, as well as additional processing time for add-on checks to be performed, thus increasing the cost of the scanner and decreasing efficiency. Also, where customer programming is required, such programming may be cumbersome and, if done incorrectly or not at all, leads to susceptibility to inaccurate processing of label information where add-ons are present. More problematic, however, is the fact that symbologies may change over time with new symbologies being created and others being revised to incorporate add-on information. Thus, programming information would need to be kept up to date and updated regularly in all installations for optimum performance.

Accordingly, there is a need for a scanner system that offers improved capture rate of add-on label information without sacrificing throughput and first pass read rate of non-add-on labels.

SUMMARY OF THE INVENTION

The present disclosure relates to systems and methods whereby the capture rate in relation to labels with add-ons is improved without sacrificing throughput with respect to non-add-on labels. The instant method comprises a mode in which the scanner "learns" over time which base label codes will have associated add-ons. In a preferred embodiment, this learning mode is a programming mode that is optionally selectable by the user and/or configured upon system installation.

In a preferred embodiment, when the scanner is first started in an installation, the required number of reads of base label information is set to a programmable lower limit which may be one or, depending upon the nature of the symbology(ies) to be read, may be a higher number established so as to satisfactorily ensure capture of label information for that symbology. Determinations regarding minimum read requirements for various known symbologies are familiar to those skilled in the art. Setting such a lower limit allows for the highest throughput of all items, but may not allow the highest possible add-on capture rate. As the scanner successfully reads both a base label and its add-on data, the base label data is stored in a list in the scanners memory. In addition to storing this base label data, the required number of reads of this particular base label is increased to a second programmable number which is higher than the first and preferably high enough to obtain a reasonable add-on capture rate. Through this method, future scans of base labels corresponding to that of one in the list store will result in additional read attempts when the add-on information has not already been captured in order to ensure that the anticipated add-on information is captured successfully. With respect to non-add-on labels, however, the initially set low number of reads is utilized to provide for optimum throughput and first pass read rate where possible. In an alternate preferred embodiment, the scanner may keep statistics on the base label successful reads and the associated add-on successful reads. Based upon this information, the scanner may adjust the required number of reads of a particular base label in order to optimize add-on capture rates with respect to future scans of that corresponding base label.

In either embodiment above, once the required number of reads of the base label have been met (either in accordance with the initial lower limit or the increased number), then the scanner will consider the label to be complete regardless of whether or not the associated add-on has been identified. The system will then accept and send the base label data as valid without further delay. This operation, too, differs from the "conditional" mode that is utilized in some current scanners wherein a base label will never be read alone if there is supposed to be an add-on associated with it.

In a further aspect of the instant system and methods, the scanner may order the list of stored base label data and/or may keep only those base labels in the list that meet certain criteria, such as frequency of occurrence. In this way the scanner does not need to have such extensive memory for the base label list. In the preferred embodiment, the list would be kept in non-volatile memory in order to retain the data in the event of power losses.

The preferred embodiments herein may advantageously offer improved capture rate of add-on label information without sacrificing throughput and first pass read rate with respect to non-add-on labels. Accordingly, the preferred embodiments herein may provide one or more of the following objects and advantages:

to provide a scanner-system which exhibits improved scanner add-on capture rate while maintaining an optimally high first pass read rate;

to provide a scanner system which exhibits improved add-on capture rate without sacrificing throughput with respect to non-add-on labels;

to provide a scanner system which learns over time which base label codes have associated add-ons;

to provide a scanner system which stores base label data in a list upon successful read of a base label and add-on;

to provide such a scanner system in which the amount of memory required to store base label data is minimized.

Other objects and advantages of the present systems and methods will become apparent to those skilled in the art from a review of the detailed description in conjunction with the accompanying drawings.

DETAILED DESCRIPTION OF PREFERRED EMBODIMENTS

With reference to the drawings, a preferred embodiment of the present invention is described as follows.

Figure 1:
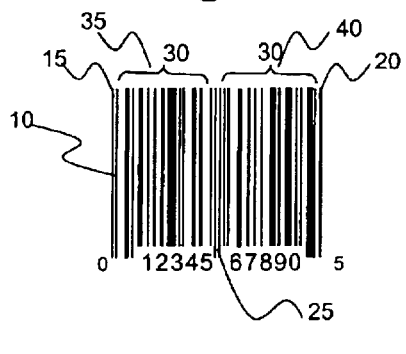
FIG. 1 is a graphical representation of a Universal Product Code (UPC) symbology that does not incorporate an add-on to the base label.

FIG. 1 is a graphical representation of an exemplary UPC base label 10 in the format of a typical Universal Product Code symbology. The UPC base label 10 comprises a start guard character 15, an end guard character 20, a center guard character 25, and twelve data characters 30 with six characters in the left half segment 35 and the other six characters in the right half segment 40. The exemplary UPC base label 10 of FIG. 1 does not have an add-on label associated therewith.

Figure 2:
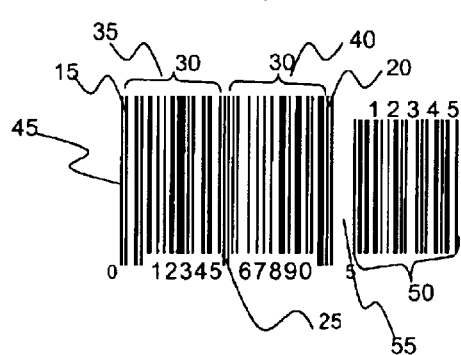
FIG. 2 is a graphical representation of a UPC symbology that incorporates a five digit add-on to the base label.

FIG. 2 is a graphical representation of an exemplary UPC base label with add-on 45. As may be seen from the figures, the UPC base label with add-on 45 comprises an identical UPC base label 10 as in FIG. 1 which comprises the same start guard character 15, end guard character 20, center guard character 25 and twelve data characters 30 with six data characters each in the left and right half segments 35 and 40, respectively. The UPC base label with add-on 45 of FIG. 2 further comprises an associated add-on portion 50 which, in the case of the label of FIG. 2, comprises a five digit add-on label separated from the UPC base label 10 portion by white space 55.

Figure 3:
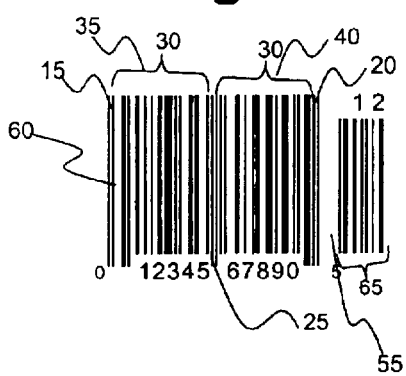
FIG. 3 is a graphical representation of a UPC symbology that incorporates a two digit add-on to the base label.

Similarly, FIG. 3 is a graphical representation of an alternate exemplary UPC base label with add-on 60. In this alternate example, the same UPC base label 10 with start guard character 15, end guard character 20, center guard character 25, and twelve data characters 30 with six data characters each in the left and right half segments 35 and 40, respectively, are included as in FIGS. 1 and 2. The UPC base label with add-on 60 of FIG. 3, however, further comprises an associated add-on portion 65 that is a two digit add-on label separated from the UPC base label 10 portion by the same white space 55 as in FIG. 2.

It is noted that there are additional variations that may exist in relation to the nature and structure of add-on labels, as well as additional symbologies that optionally incorporate add-on labels. While the detailed description herein discusses operation of the instant system and methods in relation to UPC base labels as represented in FIGS. 1 through 3, it is not intended that the scope of this application, or of the inventive concepts herein, be limited to applications involving UPC symbologies. Those skilled in the art will readily understand that the inventive concepts herein may be applied to other symbologies which incorporate add-on label information without departing from the scope or spirit of this application, including any appended claims.

Figure 4:
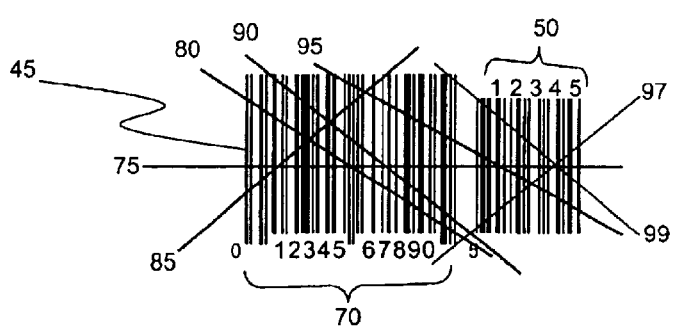
FIG. 4 is a graphical representation of the UPC symbology of FIG. 2 with graphical depictions of multiple scan lines crossing portions of the label.

FIG. 4 is a graphical representation of the identical exemplary UPC base label with add-on 45 as represented in FIG. 2 (and with like elements referenced to the element numbers of FIG. 2). The UPC base label with add-on 45 comprises a base label portion 70 and an add-on portion 50 and further depicts multiple scan lines 75–99 crossing the label at various points. A review of these scan lines 75–99 in conjunction with various scanning scenarios will assist with understanding the inventive systems and methods detailed herein.

A first scan line 75 crosses horizontally through both the base label portion 70 and the add-on portion 50. If this first scan line 75 occurred in the first pass of the label across the scanner, both existing scanner systems and a system in accordance with the preferred embodiment herein should readily identify and decode the information from both the base label portion 70 and the add-on portion 50. Once decoded, the information would be accepted as valid for further processing and processing of additional scan lines would be discontinued. Thus the desired first pass read rate would be satisfied with respect to the entire label. As will be explained in further detail hereinbelow, however, the system according to the preferred embodiment would also store the corresponding base label data in a list in memory to indicate that the particular base label should have add-on information associated with it. This latter action occurs in the preferred embodiment regardless of whether the complete base label 70 and add-on portion 50 was determined on the first pass or any other pass.

A second scan line 80 crosses diagonally through the base label portion 70 only. If this second scan line 80 occurred in the first pass of the label across the scanner, then existing systems which are optimized for first pass read rate and throughput, and which are not pre-programmed with knowledge of add-ons associated with base labels, would identify a start guard character 15, an end guard character 20, a center guard character 25 and twelve data characters 30 with six data characters each in the left and right half segments 35 and 40, respectively. Accordingly, such a scanner system would conclude that the base label portion 70 was a complete label and discontinue further processing of additional scan lines. If so, the add-on portion 50 would have been missed and would not be decoded by the system.

A third scan line 85 crosses partially through the base label portion 70 including the start guard character 15, the six data characters 30 in the left half segment 35, the center guard character 25 and some of the six data characters 30 in the right half segment 40. In this instance, an early scanning system without stitching capabilities would reject the scan line entirely and would reject the label read if no further scan line contained the entire base label portion 70. Present scanning systems with stitching may retain the third scan line 85 in the hopes of assembling it with a further scan line(s) to obtain complete label information. As detailed immediately below, either the fourth scan line 90 or the fifth scan line 95 may be combined with the third scan line 85 to provide label information.

The fourth scan line 90 crosses partially through the base label portion 70, including some of the six data characters in the left half segment 35, the center guard character 25, the six data characters 30 in the right half segment 40, and the end guard character 20. This fourth scan line 90 does not, however, cross through the add-on portion 50. Regardless, a present system with stitching capabilities may combine the third scan line 85 and the fourth scan line 90 to obtain the complete information with respect to the base label portion 70 alone. As with the discussion regarding the second scan line 80, above, an existing system without add-on knowledge would conclude that the base label portion 70 was a complete label and discontinue further processing of additional scan lines. If so, the add-on portion 50 would have been missed and would not be decoded by the system.

Like the fourth scan line 90, the fifth scan line 95 crosses partially through the base label portion 70, including some of the six data characters in the left half segment 35, the center guard character 25, the six data characters 30 in the right half segment 40, and the end guard character 20. As well, the fifth scan line 95 also crosses through the white space 55 and entirely through the add-on portion 50. In this instance, a scanning system with stitching capabilities may combine the third scan line 85 and the fifth scan line 95 to obtain the complete information with respect to both the base label portion 70 and the add-on portion 50. As with the first scan line 75, once an add-on portion is associated with a particular base label, that base label information is stored in a list in memory for use in processing of future labels as detailed further hereinbelow.

The sixth scan line 97 and seventh scan line 99 represent partial scans wherein only the add-on portion 50 (scan line 97) or the add-on portion 50 with end guard character 20 (scan line 99) are crossed. In a system without stitching capabilities, such partial scan lines would be rejected and would not prevent rejection of label information where add-on information was anticipated. In a system with stitching capabilities, the information from the sixth scan line 97 or seventh scan line 99 could be combined with other partial scans, e.g., the second scan line 80, to yield the entire label information. It is noted that whether or not stitching of such partial scan lines (i.e., wherein little or no overlap exists with the partial scan including the add-on and the partial scan including the base) would be allowed may be dependent upon the nature of the add-on and symbology in question. For example, stitching under such circumstances may be allowed with respect to a five character add-on portion 50 while not with respect to a corresponding partial scan of a two character add-on portion 65 since reading of the former is less prone to error than that of the latter.

Even if an existing scanning system were programmed to know that an add-on should be associated with a particular base label, the system would reject the second scan line 80 of FIG. 4 since there is no add-on information present. Similarly, despite stitching the third scan line 85 and the fourth scan line 90, such a system would also reject the resulting base label portion 70 information since there is no add-on information present. If the required reads were set at one, such an existing system in both of the above instances would indicate a failed read and would require additional read attempts until the add-on information was obtained in a further scan. If no add-on were present or ever detected, then such a system operating in the typical known conditional mode would continue to reject the label entirely, despite having complete base label information.

In order to prevent the above dissatisfactory results, existing systems without knowledge of the existence of add-ons would have to be pre-programmed with a required number of reads sufficiently high enough to ensure that both base label and add-on information were both captured. However, this pre-programming is not ideal since such a system, if a label without an add-on (e.g., as represented in FIG. 1) was completely scanned, would require additional reads before accepting the label as valid even though there is no further information to be obtained. Thus throughput and first pass read rate is sacrificed.

The above problems may be addressed by maintaining the lowest required number of reads for all labels except those that get identified as having add-ons as the system processes labels over time. In this latter regard, information regarding the base labels that have add-ons associated gets stored and only labels with that same base label are subject to a requirement for a higher number of reads. As well, the instant system provides that even for base labels which have been identified as possibly having associated add-ons, if the add-on information is not identified within the higher number of attempted reads, the system will still accept the valid base label information for processing rather than rejecting the label entirely. Since only information regarding base labels with add-ons that have previously been processed is maintained in the instant system, there are significant advantages over existing pre-programmed systems in terms of decreased memory requirements, easier installation and configuration, and lesser database maintenance requirements. Further details regarding the instant system and methods is best understood in conjunction with a review of FIG. 5 immediately below.

Figure 5:
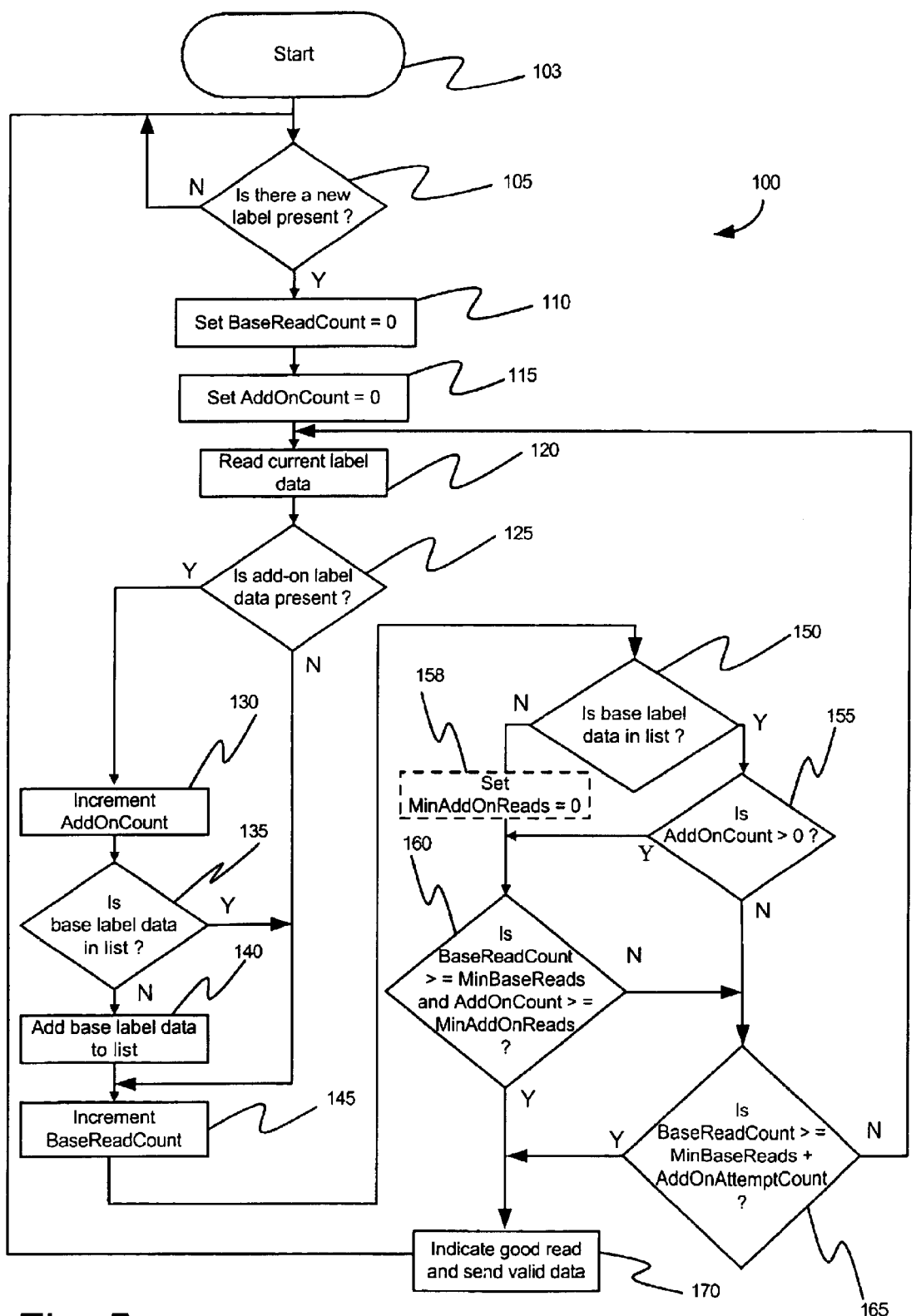
FIG. 5 is a flow diagram illustrating a method for processing label data to improve capture rate of add-ons without sacrificing throughput of non-add-on labels in accordance with a preferred embodiment herein.

FIG. 5 illustrates a method for improving capture rate of add-ons without sacrificing throughput of non-add-on labels in accordance with a preferred embodiment herein. The method comprises a mode in which the scanner "learns" over time which base label codes will have associated add-ons. It is noted that label information to be processed in accordance with the flow diagram of FIG. 5 has already been scanned and initially processed, i.e., decoded, and determined to comprise at least a base label, if not a complete base label with add-on. In addition, it is noted that the system of the preferred embodiment further incorporates stitching capabilities and, where applicable, stitching of partial scans is performed prior to processing in accordance with the flow diagram of FIG. 5 (or any of the systems in the flow diagrams of FIGS. 8–12).

A preferred method of system 100 herein begins at Start (step 103) in FIG. 5. The system first determines whether new label information is present (step 105). If not, the system remains at step 105 and continues to monitor for new label information. If new label information is present at step 105: the system sets the variable BaseReadCount, representing the number of times a particular set of base label data has been read within a set of label information, to zero(step 110). The system next sets the variable AddOnCount, representing the number of times a particular add-on has been read within the set of label information, also to zero (step 115).

Upon initialization as above, the system then proceeds to begin reading current label data (step 120) which may comprise base label data alone and may further comprise possible add-on label data. In this latter regard, the system next checks whether or not add-on label information is present (step 125). If add-on data is present, the system next increments variable AddOnCount (step 130) which keeps track of the number of times the add-on data has been read in relation to a particular set of current label data. As will be further explained hereinbelow, such information may be utilized when more than one read of add-on label data is required to ensure decoding accuracy in relation to particular labels.

Upon incrementing AddOnCount (step 130), the system next checks whether or not the corresponding base label data is already in the list of base labels that have previously been identified as having add-ons associated therewith. It is noted that, unlike prior systems that require such information to be pre-programmed, the list in accordance with a preferred system and method is created as label information is read. Accordingly, upon first installing the system of the preferred embodiment, the list is empty. As the system is used in operation, base label data is stored in the list only after the first time that add-on data has been associated with it.

If the determination at step 135 is that the base label data is not on the list, then the system proceeds to add the base label data to the list (step 140). Once the base label data is added to the list, or upon a determination at step 135 that the base label data was already on the list, then the system proceeds to increment variable BaseReadCount (step 145) as a means of tracking the number of times the particular base label data has been read. Likewise, if the system determined at step 125 that there was no add-on data present, then the system proceeds directly to step 145 to increment the BaseReadCount in relation to the base label without add-on that is presently being processed.

Upon incrementing BaseReadCount at step 145, the system then proceeds in accordance with the determination as to whether the base label data is in the list at step 150. It may be seen that with respect to non-add-on labels (e.g., as depicted in FIG. 1), the determination at step 150 is the first check regarding whether or not the base label data is in the list and the answer will always be "No" and the system would proceed to verify the label information in accordance with the optimum throughput requirements established for that symbology. With respect to labels which have an add-on, but where the add-on has not been read in the current label data processed to that point, the determination at step 150 would likewise be the first check regarding the base label being in the list. However, where that base label had previously been read with an add-on, the base label data would be in the list and the system would attempt further reads to capture the add-on data as further detailed hereinbelow.

If the determination at step 150 is "Yes", i.e., the base label data is in the list, the system then proceeds to check whether or not AddOnCount is greater than zero (step 155). A "Yes" determination at step 150 is indicated in any of the following situations: 1) base label data and add-on data have both been read for the first time (in which case the base label data was placed on the list in step 135); 2) base label data and add-on data have both been read in the current read of label data, but the base label data had already been placed on the list from reads of a prior label; or, 3) base label data has been read without add-on information, but that base label data has previously been associated with add-on data from reads of a prior label.

In the first two situations above, AddOnCount has been incremented at step 130 and, thus, is greater than zero. Since the add-on data has been captured in either of these situations, there is no reason to require additional reads of the base label data over the optimum lower limit established for that symbology. Thus, the system proceeds, at step 160, to determine whether the BaseReadCount is greater than or equal to the value set for MinBaseReads (i.e., the minimum number of times that the base label data must be seen in order to be accepted) in relation to that symbology.

It is noted that the variable MinBaseReads may be established in a variety of ways. On the one hand, where a high first pass read rate is desired, MinBaseReads may be set to one for all symbologies. This setting may be practical for symbologies that are very reliable and are readily decoded and verified (e.g., Code 128). However, with respect to certain symbologies, it may be desirable to require multiple reads of the base label as a means of verifying the accuracy of the data read prior to accepting the label information as valid for further processing. In such case, MinBaseReads may be set to a lower limit that is greater than one. By setting MinBaseReads to a lower limit irrespective of add-on considerations (whether one or otherwise), the highest throughput of all items is enabled, though highest possible add-on capture rate may not.

The considerations involved in selecting an appropriate lower limit to be established with respect to certain symbologies would be understood to skilled in the art following the disclosure herein. Further, following the present disclosure, it will be understood that MinBaseReads may be set universally for all symbologies to be read by a particular system, and may comprise a programmable value that may be established by the user or otherwise at system start-up. Alternatively, and as in the preferred embodiment herein, the value for MinBaseReads may be selected by the system from a set of stored values associated with the various symbologies that may be read by the system (i.e., may be symbology dependent).

It is noted that MinBaseReads values may be set for various symbologies in accordance with a variety of factors. For example, preprinted labels may have a lower value of MinBaseReads associated therewith than store printed labels. As well, certain symbologies are considered by those skilled in the art to have structures that lend themselves to greater reliability. Exemplary values for MinBaseReads with respect to various symbologies may be as follows: one for preprinted UPC A labels, two for UPC E labels, two for in-store printed UPC A labels, one for EAN-13 labels, etc.

In addition to checking whether or not the BaseReadCount is greater than or equal to the value set for MinBaseReads in relation to that symbology at step 160, the system may optionally further determine whether AddOnCount is greater than or equal to MinAddOnReads (i.e., the minimum number of times that add-on data must be seen in order to be accepted based upon the type of add-on).

Since it is possible for base label data to be read without add-on data prior to being read with add-on data, there may arise a situation where the base label data is read numerous times before the add-on data is read. If the MinBaseReads requirement is satisfied at the time the add-on data is read, a system which checks only for satisfaction of MinBaseReads may pass such base label and add-on data with only one read of the add-on data. While this method may not be problematic with respect to highly reliable symbologies, such as Code 128, or with respect to add-ons which are less prone to error, such as five-character add-ons, there may be circumstances wherein it is desirable to ensure that the add-on data is separately read a certain minimum number of times, irrespective of the number of times the base label data is read, as a means of ensuring accuracy. The MinAddOnReads variable provides such a mechanism.

As with MinBaseReads, MinAddOnReads may be universally set in relation to any and all add-ons or, preferably, may be selected by the system from a set of stored values associated with the various add-on types that may be read by the system (i.e., may be add-on type dependent). The choice of values to be associated with the various add-on types would be dependent upon considerations that would be known to one skilled in the art following the disclosure herein. Additionally, it may be understood that in relation to current label data for which no add-on has been associated (i.e., base label data is not in the list), the value for MinAddOnReads would be set to zero (such as by the optional step 158—Set MinAddOnReads=0).

It may be seen from FIG. 5 that the determination at step 160 requires that both of the above tests (BaseReadCount greater than or equal to MinBaseReads and AddOnCount greater than or equal to MinAddOnReads) must be satisfied before a "Yes" outcome is indicated. If either or both of these tests are negative, then either the base label data or the add-on data or both have not been read the minimum number of times required to ensure accuracy. Accordingly, the system passes back to step 165.

Once both determinations at step 160 are satisfied, then both the base label data and the add-on data have been seen a sufficient number of times to ensure accuracy and the system proceeds at step 170 to indicate a good label read and to send the valid label data for further processing, such as retrieval of associated price and other encoded information from a look-up table based upon the label data.

Referring back to the third situation in which a "Yes" determination would be indicated at step 150 above, no add-on information-has been read with the current base label data despite the fact that add-on data is anticipated in relation to that base label data based upon prior "learning" by the scanner. In such instance, AddOnCount has not been incremented from zero (where it was set at step 115) and, thus, the determination at step 155 is "No" (AddOnCount is not greater than zero). Accordingly, it is necessary to require further reads of the base label data in an attempt to capture the add-on data that is expected with that base label data.

To this end, the system next determines whether the BaseReadCount is greater than or equal to the MinBaseReads plus an AddOnAttemptCount value (step 165). The AddOnAttemptCount value represents the number of additional, reads that will be required before accepting base labels which have previously been identified as having add-on data (i.e., base labels on the list), but which have currently been read without any add-on data. Since add-on data is anticipated with the base label data in this circumstance, the preferred system and method will require a certain greater number of base label reads in an attempt to capture the add-on information. Thus, where MinBaseReads may be set to one for a high first pass read rate, base labels for which add-on data is anticipated would not be passed on the first read if the add-on data is missing. If AddOnAttemptCount is set, for example, to three, the system would require a base label to be read up to four times in an attempt to capture expected add-on data.

It is noted that while this immediate example indicates that the system will make up to four attempts (based upon reads of the base label data) to capture the add-on data, the preferred system and method may actually pass the label and add-on data in less reads. Once the add-on data is captured and the criteria of step 160 are satisfied, the complete label data will be passed as detailed above regardless of whether the base label data has been read the additional times indicated by the AddOnAttemptCount value.

Referring back to step 165, if the BaseReadCount is not greater than or equal to the MinBaseReads plus AddOnAttemptCount value, then the system returns to step 120 to obtain additional base data and possible add-on data for the current label. If such current label data continues to not include the expected add-on data, then the system will continue to reach step 165. Such additional reads will continue until the add-on information is captured (at which point processing will continue in accordance with step 160) or the new required number of reads of the base label have occurred (i.e., MinBaseReads plus AddOnAttemptCount)— whichever comes first.

Once the base label data has been read a number of times that is greater than or equal to the MinBaseReads plus AddOnAttemptCount value, the system and method of a preferred embodiment will proceed to step 170 and will accept the base label data alone as valid and will indicate a good read and send the data for further processing as previously described. Thus, the system and method of the preferred embodiment will not reject an otherwise valid base label data merely because the system was unable to capture the add-on data, as would some existing systems.

While a preferred system and method will ultimately accept base label data without anticipated add-on data after an extended number of reads, alternate embodiments may be envisioned as further detailed below. In one such embodiment, the system may operate interactively with the back-end processing to determine whether or not to pass label data. Such alternate operation may be beneficial in instances where the anticipated add-on data provides critical information (e.g., price information) in relation to the item being scanned and, accordingly, use of the base label data alone is impractical. It may be envisioned that in such circumstances the system may return to step 165 and require still further read attempts to capture the add-on data.

As indicated previously, with respect to the first occurrence of a new base label with add-on, that base label is stored in the data list. Subsequently, a new required number of reads of the base label comprised of the MinBaseReads value plus the AddOnAttemptCount value is used with respect to future reads of that base label in order to provide the opportunity to capture anticipated add-on data. In a preferred embodiment, the AddOnAttemptCount value would be in the range of one to four and would be dependent upon the symbology in question (such as may be determined from an assessment of the base label and/or add-on data or as set by the user or by other such means). Alternatively, a fixed value could be implemented for AddOnAttemptCount regardless of the base label data or symbology in question. In the case where MinBaseReads was initially set to one (e.g., for reliable, preprinted labels), the new required minimum reads of the base label would be in the range of two to five required reads to provide for potential capture of add-on information.

In a similar manner, the MinAddOnReads value may also be fixed or it may be dependent upon the nature of the anticipated add-on. In this regard, more reliable add-on symbologies (such as five digit add-ons) may have a lower value of MinAddOnReads associated with them than would less reliable ones (e.g., two digit).

In an alternate preferred embodiment, the system may store statistical information in association with stored base label and/or add-on data. Such statistical information may be utilized by the system to optimize the values of the variables used in the processing of additional labels and/or to assist with the maintenance of the data list for optimum performance.

As may be understood, maintaining high throughput performance for the scanning of labels requires that the data list may be searched quickly to determine if a label being read is already on the list and that new items may be quickly added to the list. The overall length of the list (i.e., the number of entries associated with different base labels) affects the speed with which it maybe searched, and also has an impact on the cost of the scanner because of associated memory requirements. Likewise, the width of the list (i.e., the amount of data stored with each base label entry) also has an impact on the amount of memory required. Consistently with other scanner design trade-offs, the data list is preferably constrained in length and width to meet the speed/cost requirements of the scanner design while still providing acceptable performance with respect to add-on capture. The instant preferred embodiment provides one such a system and methods whereby this trade-off may be optimized.

Figure 6:
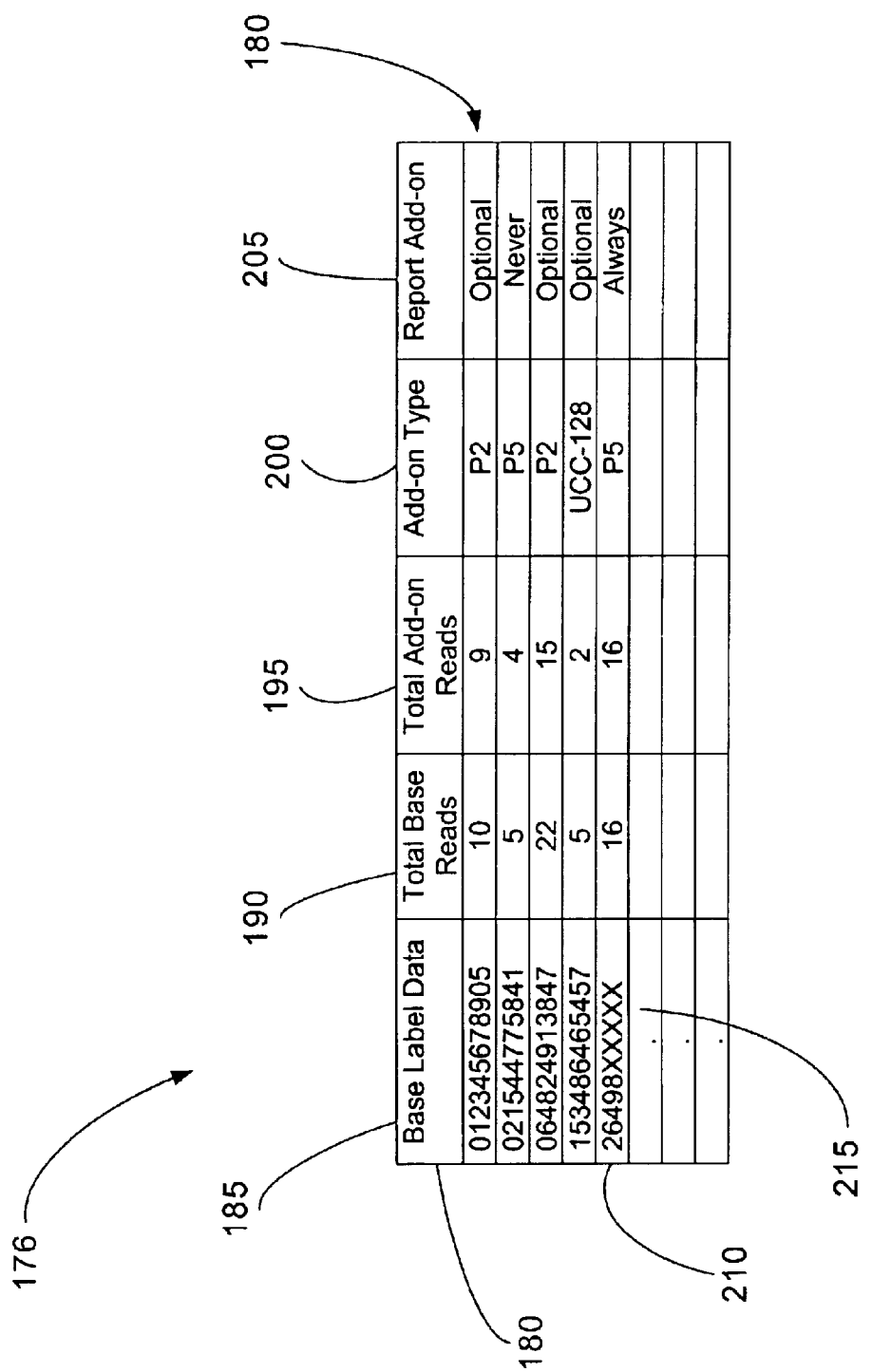
FIG. 6 is a graphical representation of a list for managing statistical information in relation to labels with add-ons in accordance with a preferred embodiment herein.

By way of example and with reference to FIG. 6, a stored data list 175 in accordance with a preferred embodiment comprises fields 180 which may include Base Label Data 185, Total Base Reads 190, Total Add-on Reads 195, Add-on Type 200, and Report Add-on 205. In operation, each of these fields 180 comprises the following definitions and characteristics in-a preferred embodiment.

Base Label Data 185 is the field 180 in which label data in relation to base labels for which an add-on has been associated is stored. With reference to FIG. 5, for example, such base label data may be stored in conjunction with step 140. As a means of conserving memory (and/or decreasing memory requirements), the exemplary data store 175 contemplates that base label data may be grouped in some instances. The fifth data entry 210 of FIG. 6 illustrates grouping of Base Label Data 185 through the use of "don't care" digit positions 215. Such positions are identified with an "X" in the data list entry and represent positions which may be of any value (i.e., regardless of the value of each "don't care" digit 215, the corresponding base label would be expected to have an add-on associated with it). The determination as to whether or not a certain data position comprises a "don't care" digit 215 may be made in relation to a mask specified elsewhere or otherwise derived from accumulated past base label data.

The Total Base Reads 190 field represents the number of times the corresponding Base Label Data 185 has been read. As a means of list management, the system may be designed so as to periodically decrease this number, as described below, in order to "age" listed items.

The Total Add-on Reads 195 field represents the number of times an add-on has been seen with the corresponding Base Label Data 185. As will be further detailed hereinbelow, the Total Add-On Reads 195 value may be utilized in comparison with the Total Base Reads 190 value to variably adjust the number of required reads of base labels and/or add-ons under certain conditions (e.g., where the add-on has been seen a high percentage of times with the base label, a lower value for AddOnAttemptCount may be utilized).

The Add-on Type 200 field indicates the type of add-on label that has previously been associated with the corresponding Base Label Data 185 (for example, a two-digit add-on such as UPC P2, a five-digit add-on such as UPC P5, or other add-on type such as UCC-128). Such information may be used to variably adjust the MinAddOnReads value to reflect the differing reliability associated with the reading of different add-on symbologies.

The Report Add-On 205 field is a control field which is utilized in the determination as to whether or not an add-on may, must or will not be output from the scanner when the corresponding Base Label Data 185 is read. In a preferred embodiment, this field is set to "Optional" for normal entries which have been automatically added to the list (such as through operation consistent with FIG. 5, above). A setting of "Optional" results in operation as previously described in relation to FIG. 5 wherein a base label will be accepted without an add-on after attempting a number of additional reads corresponding to the AddOnAttemptCount value. Settings of "Never" or "Always" are entered in the list by some other means, such as via programming labels, factory configuration, or through communication from a host terminal. A setting of "Never" causes any add-on seen with the associated base label to be ignored (i.e.; base label data alone will be passed regardless of the presence of add-on information).

A setting of "Always" prevents the acceptance of any base label data that is on the list unless the anticipated add-on data is also present to be passed.

As indicated further herein, other data fields may be utilized in addition to the above exemplary fields. For example, in an embodiment where it is desired that the number of extra read attempts (i.e., AddOnAttemptCount) be variable dependent upon prior read statistics, then the current value for this variable may be stored as another field in relation to the corresponding base label data in the list.

In order to keep the length of the stored data list 175 to a reasonable size, the methods of a preferred embodiment provide for the removal of data from the list based upon various criteria. In one embodiment, data that are of lesser importance, such as very old entries or entries which are rarely encountered (e.g., low total base read values) may be removed. To this end, the count of the total number of times a base label has been seen (i.e., Total Base Reads) may be reduced at regular time intervals and the base data entry removed from the list if the total reaches zero or some fixed lower limit. New entries may be added based upon different methods, such as replacing the oldest or least-seen existing entry with the new data, or randomly placing the new entry within a group of entries which all have the same minimum level of total base reads or maximum level of age.

It is noted that the method of using age of entries may be of particular benefit where add-on data codes are tied to seasonal items. In such instances, there may be large quantities of certain add-ons that only appear for short periods of calendar time. Since these items may typically be cleared from shelves after the season has ended, it is unlikely that the data associated with such items will need to be accessed for some time. Accordingly, it is beneficial to clear out unused data after a season has passed to make room for a different season's data. This clearing out may be done by removing items that have not been scanned for some user-selectable period of time (e.g., such as 8 days).

It is noted that if the computing hardware used is sufficiently fast that the time to search a full list is not a concern, it may only be necessary to remove an item from the list when the available memory has been filled and a new item(s) is to be added to the list. If it is desired to minimize the list size to reduce the typical search time, the strategies described above may be used to discard items even when the list is not full.

Another situation wherein list management methods may prove beneficial is with respect to entries that may comprise erroneous data. In some instances, a scanner may inadvertently interpret noise or "read" extraneous printing as appearing to be add-on data when reading a base label. This read would cause the corresponding base label to be added to the list when, in fact, no add-on information is actually associated therewith. As a result, however, the time to read that base label when it is scanned again later would be increased since the system would be attempting to capture the non-existent add-on information. To minimize the effect of such occurrence, a preferred embodiment herein provides for discarding entries that are seen to have a very small value of Total Add-on Reads 195 relative to Total,Base Reads 190. Testing for this condition may be set up to occur periodically for the whole list or may be done on a individual basis when updating the Total Base Reads 190 value for an entry.

As indicated previously, the Add-on Type 200 field records the type of add-on associated with a corresponding Base Label Data 195. In a preferred embodiment, each Add-on Type is associated with a particular AddOnAttempt-Count value which specifies the incremental number of times that the system wilt attempt to read the corresponding Base Label Data 185 in order to capture add-on data before it will finally accept the base label without seeing an add-on (assuming the Report Add-On 205 field is set to "Optional"). As indicated previously, certain Add-on Types have less reliable error detection means than others. For example, it is easier to mistakenly see (or misread) a P2 than a P5, and easier to mistakenly see a P5 than a UCC-128. If we know that a P5 has been seen with a particular base label in the past, in many applications it would be prudent to reject a P2 which was apparently read with this base label. On the other hand, if a P2 had been seen previously, a P5 seen in a later scan is more likely to be the correct data, so the Add-on Type should be upgraded to P5. Enabling this feature should be user or factory configurable, to allow using mixed add-on types when necessary.

While several alternative methods for using statistical information maintained in conjunction with the data list have been described herein, there are many ways in which such data may be used to adjust the variables in relation to the number of required base reads, the number of additional add-on attempt count base reads, and/or the minimum number of required add-on reads. For example, whether or not add-on data was successfully captured with associated base label data within the initial required number of reads (MinBaseReads) or the additional reads set by the AddOnAttemptCount value may be noted and used as a factor in setting a new MinBaseReads value and/or AddOnAttemptCount value for future reads. An alternative embodiment may further require that multiple failures to capture an add-on, either sequentially or over time, would be required before a variable would be changed from the initial value.

It is noted that many further variations may be envisioned. As well, the initial MinBaseReads value may, in a preferred embodiment, be set to two. However, this value may vary from system to system. Many considerations may be taken into account in determining the initial and variable values for particular systems. Such considerations in relation to the variety of symbology types that may be scanned by a particular system include a determination as to the likelihood under various circumstances that the capture of add-on data could be successfully ensured within a certain number of reads. Other considerations may become familiar to one skilled in the art given teachings herein. In each case a counter-consideration is to attempt to obtain successful reads of base labels and add-ons in the minimum number of reads so as to optimize the overall throughput of the system.

For purposes of the following discussion, "upper limit" refers to the highest number of reads set with respect to particular symbologies. Thus, with reference to FIG. 5, "upper limits" would correspond to MinBaseReads+AddOnAttemptCount as indicated in step 165. In a preferred embodiment, changes to the upper limit value may be effected through changes to the AddOnAttemptCount value. It is understood, however, that changes to the upper limit may likewise be effected through changes to the MinBaseReads value alone and/or in conjunction with the AddOnAttemptCount value.

With respect to the establishment of upper limits, selection within a range from two to five reads would be appropriate for most applications. In extreme situations, more reads may be utilized; however, in all instances it is a matter of trading off the desire to make sure that the add-on is ultimately captured with the desire to ensure that the least number of reads necessary are used so as not to drag overall system throughput down substantially. For example, use of thirty as a number of reads would render the scanning system virtually useless with respect to such labels and, if used in a system with a non-variable upper limit, would significantly impair throughput.

Where variable upper limits are set independently (either through adjustment of the MinBaseReads value and/or the AddOnAttemptCount value), certain of the base labels may have higher upper limits as necessary for confidence in capturing add-on information while others may have lower limits, thus impacting overall throughput to the lowest extent practical. Establishment of variable upper limits would then be based upon established criteria and considerations. An alternate embodiment herein makes use of retained statistical information to continuously adjust the upper limit as confidence levels might change over time. The more often the base label and add-on are both captured in a first pass, or in less than the defined upper limit (i.e., MinBaseReads+AddOnAttemptCount), then the upper limit might be adjusted downward. The less often the base label and add-on are both captured within the upper limit, then the number could be increased until the system was able to confidently capture the information, or until an absolute maximum allowable limit was reached.

For example, if, over time, a particular label is read completely (base and add-on) a high percentage of the time on a first pass, then this label may have a lower upper limit than a label that is read completely a low percentage of the time on a first pass. Other factors may include how many times the base label is read without the add-on. For example, if an upper limit is set and that particular base label is still read a significant number of times without capturing the add-on information, then the upper limit for that label may be re-adjusted to a higher number. If, on the other hand, a high upper limit is set and the label with add-on continuously gets read in a lower number of reads, the upper limit-may be re-adjusted downward due to the increased confidence that it will likely still be captured.

Each of the above variations, as well as others, are intended to be within the scope of the instant system and methods as provided in this detailed description and defined in any appended claims.

As indicated previously, there may be some instances in which the upper limit for the required number of reads may be decreased rather than increased. In this regard, it is noted that as base label data and add-on data are successfully read, the system may still further process the statistics in relation to that data prior to sending the data as a good read. As such data is reviewed, the system may note that over the course of time the add-on data had been successfully captured with the base label data in less than the required number of reads. Depending upon how many times this condition has occurred, whether such instances have been sequential, the percentage of time this condition has occurred versus a non-captured add-on, etc., the system may determine that a decrease in the upper limit is warranted. If so, such new upper limit would be stored in association with the base label data and would be utilized by the system the next time that base label data is read without capture of the associated add-on data.

As a further alternative, a preferred embodiment may provide for ordering of the list of base label information. In this regard, the system may order the list based upon the frequency of occurrence of particular base labels. Further, as a means of increasing efficiency and reducing memory requirements for the base label list, the system may only keep those base labels in the list that meet certain criteria, such as a certain frequency of occurrence over time. By assessing frequency over time, new labels may be retained in the list until the system is confident that the label is truly an infrequently used label versus just a first time label that has been introduced and will continue to occur with some frequency.

Figure 7:
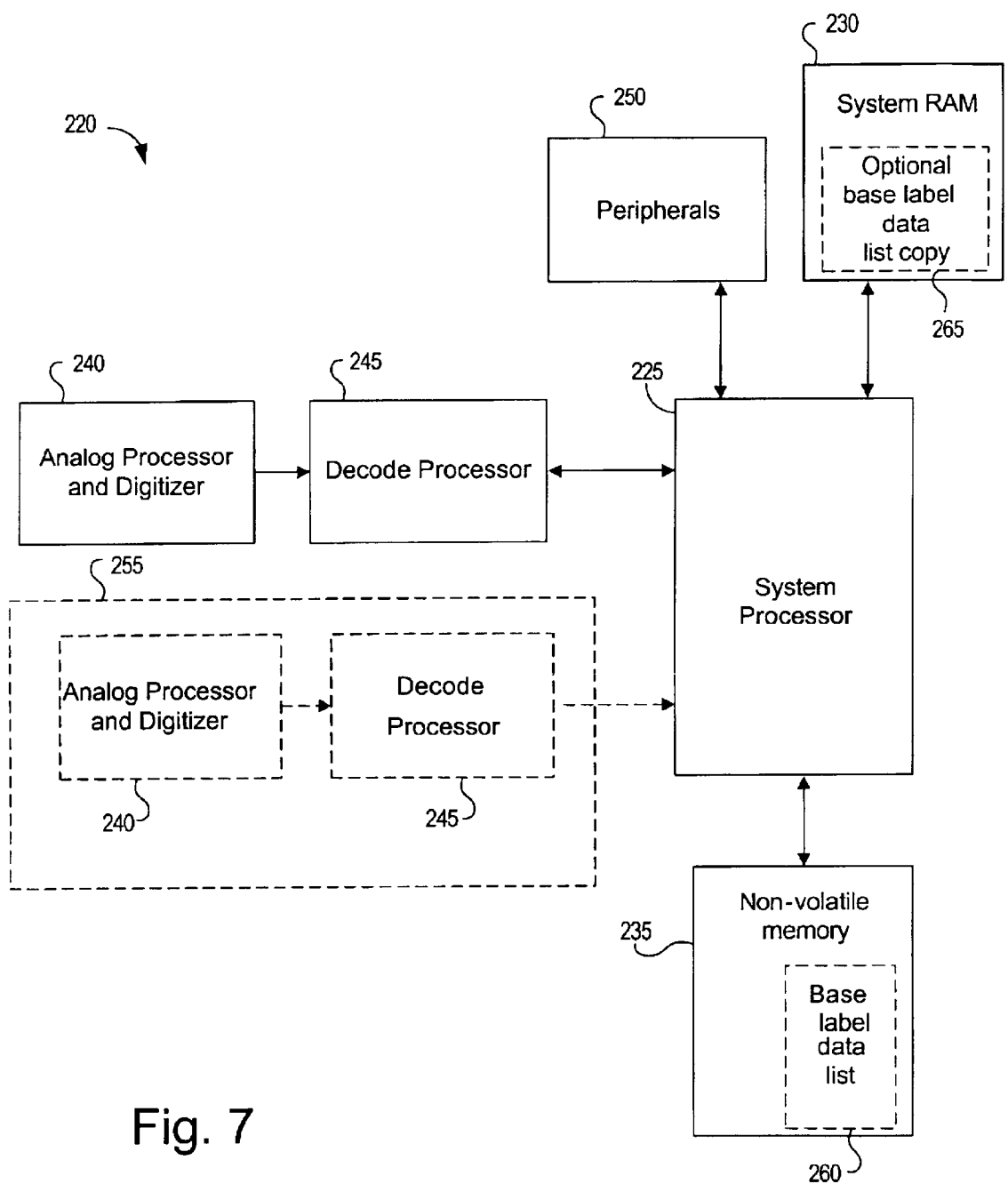
FIG. 7 is a block diagram depicting the system for improving add-on capture rate in accordance with a preferred embodiment herein.

FIG. 7 is a block diagram depicting the processing components of a system in accordance with a preferred embodiment herein. The overall scanner system of a preferred embodiment may comprise a fixed, omni-directional scanner, such as may be employed in supermarket and other retail environments. However, while this embodiment is described in relation to such a fixed scanning system, the inventive concepts herein are also applicable to any scanning system which may be usable with respect to items that incorporate barcodes including add-on portions to be captured.

With reference to FIG. 7, the processing system 220 comprises system processor 225, system RAM 230, non-volatile memory 235, analog processor and digitizer 240, decode processor 245, and peripherals 250. Such peripherals may comprise, for example, indicators, point-of-sale (POS) interfaces, weighing devices, other data capture devices, and/or displays. Optionally, the processing system 220 may further include one or more additional signal channels 255 with additional analog processors and digitizers 240 and decode processors 245. In accordance with a preferred embodiment, the base label data list 260 (as referenced, for example, in relation to steps 135 and 140 of FIG. 5) is stored in non-volatile memory 235 to enable the retention of accumulated data in the event of a power loss. Optionally, a base label data list copy 265 may concurrently be stored in system RAM 230.

In operation, system 220 receives input data comprising possible scan line data into analog processor and digitizer 240 which processes and prepares the potential data for decoding by decode processor 245. Decoded information is then passed to system processor 225 in which, among other things, the decoded information is processed in accordance with the method of FIG. 5 herein. Base label data for which add-on information is associated is stored in the base label data list 260 (and optionally the copy 265) and processing is accomplished as previously detailed hereinabove.

The systems and methods described herein may offer improved performance in relation to the capture of add-on label information without sacrificing first pass read rate of non-add-on labels or overall throughput of the system. While certain systems and methods have been set forth in the form of preferred embodiments, it is noted that modifications to the disclosed system and methods, as well as other alternative embodiments may be devised in accordance with the teachings herein.

By way of example, although the preferred embodiments above have been described with reference to counts of the number of reads of base label data required to be undertaken to attempt add-on capture, in view of the teachings herein one skilled in the art could recognize that use of a time-based methodology may similarly be employed to the same advantages. In this regard, for example, a minimum time for successfully reading label data would be set initially with respect to reads of all labels. As add-on data is associated with specific base label data, the system and methods of such an embodiment would provide for an increase in the read time with respect to future reads of those particular base labels in order to attempt to capture the add-on information.

Further, it is noted that while the system 220 of FIG. 7 is depicted as including multiple discrete components, such depiction is merely for purposes of explanation herein and should not be seen as a limitation. Many modifications to the design of the system 220 may be envisioned without departure from the scope or spirit of the inventive concepts set forth herein or in any claims appended hereto. For example, one or more of the system 220 components may be designed into a single circuit board or may reside on multiple circuit boards without materially affecting operation in accordance with the inventive concepts herein.

Where the labels potentially including add-ons, in a simplified form, a method of reading such label may include the steps of:
  formulating a list of base label data for which add-on data is expected to be associated;
  identifying label data comprising at least base label data;
  determining whether the base label data identified is in the list;
  setting a first minimum number of reads required for base label data determined not to be in the list;
  setting a second minimum number of reads, greater than the first minimum number, required for base label data determined to be in the list.

Where the labels potentially including add-ons, in a simplified form, a method of reading such label may include the steps of:
  formulating a list of base label data for which add-on data is expected to be associated;
  identifying label data comprising at least base label data;
  determining whether the base label data identified is in the list;
  requiring a greater number of minimum reads for base label data determined to be in the list than for base label data determined to not be in the list.

Figure 8:
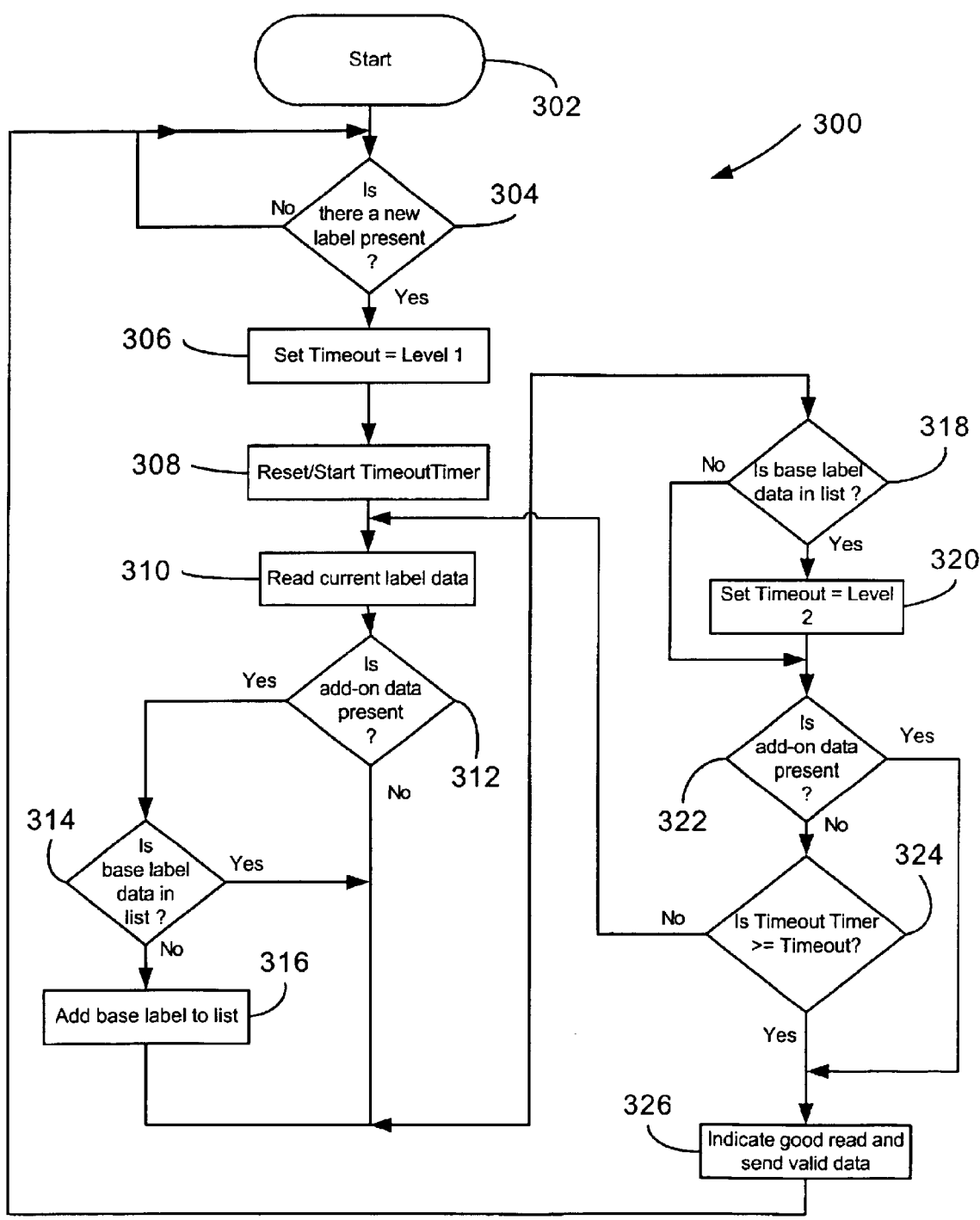
FIG. 8 is a flow diagram of an alternate method for improving add-on capture rate.

In the previous embodiments, the variable MinBaseReads is set based upon whether or not the base label data is determined to be in the list of base labels which have been found to have been associated with an add-on. If the base label is on the list, then the MinBaseReads is set at a higher level. A primary purpose of setting the MinBaseReads at the higher level is to allow additional time for the scanner to detect the add-on code when the base label has been determined to have previously been associated with an add-on. FIG. 8 is a flow diagram of an alternate method 300 for improving add-on capture rate using a timeout methodology. Commences at start step 302, the system then determines whether new label information is present at step 304. If "No" the system remains at step 304 and continues to monitor for new label information. If new label information is present at step 304, the system sets at step 306 the variable Timeout to Level 1. The variable Timeout represents the time which will be permitted for the system to detect an add-on code once it has detected a base label, to Level 1. Level 1 may be equal to zero or some higher value depending upon how much additional time the system will be permitted to search for the add-on code. The system then resets or starts the Timeout-Timer (at step 308).

Upon initialization as above, the system then proceeds to begin reading current label data (step 310). This read data may comprise base label data alone and may further comprise possible add-on label data. In this latter regard, the system next checks whether or not add-on label information is present (step 312). If "No" the system proceeds to step 318; if "Yes" the system next checks (at step 314) whether or not the corresponding base label data is already in the list of base labels that have previously been identified as having add-ons associated therewith. Unlike prior systems that require such information to be pre-programmed, the list in accordance with this embodiment is created as label information is read. Accordingly, upon first installing the system 300, the list is empty. As the system 300 is used in operation, base label data is stored in the list only after the first time that add-on data has been associated with it.

If the determination at step 314 is that the base label data is not on the list, then the system proceeds to add the base label data to the list (step 316). Once the base label data is added to the list, or upon a determination at step 314 that the base label data was already on the list, then the system then proceeds in accordance with the determination as to whether the base label data is in the list at step 318.

If the determination at step 318 is "No", (i.e., the base label data is not in the list), the system then proceeds to step 322, thus the variable Timeout remains at Level 1.

If the determination at step 318 is "Yes", (i.e., the base label data is in the list), the system then proceeds to step 320 where the variable Timeout is set to Level 2 (Level 2 being higher than Level 1) and then to step 322. A "Yes" determination at step 318 is indicated in any of the following situations: 1) base label data and add-on data have both been read for the first time (i.e. a "No" out of step 314 in which case the base label data was placed on the list in step 316); 2) base label data and add-on data have both been read in the current read of label data, but the base label data had already been placed on the list from reads of a prior label (i.e. a "Yes" out of step 314); or, 3) base label data has been read without add-on information, but that base label data has previously been associated with add-on data from reads of a prior label (via a "No" out of step 312).

In the first two situations above, since the add-on data has been captured in either of these situations, there is no reason to require additional reading of the base label data over the lower time period Timeout=Level 1. Thus, the system determines (again) whether the add-on data is present (at step 322) and if "Yes" proceeds directly to step 326 indicating a good read; if "No", the system proceeds to step 324 where it determines whether the Timeout Timer (which started at step 308) has reached the Timeout period. If "No", the system returns to step 310 to continue looking for add-on data; if "Yes" the system proceeds to step 326 indicating a good read. After a good read is indicated, the system resets returning to step 304 looking for a new label.

The variable Timeout is set at either Level 1 (if the base label is not on the list) or at the Level 2 (if the base label is on the list. Level 2 being higher than Level 1, the system is given a greater time period (as determined at step 324) to continue to search for add-on data when the base label data is on the list.

It is noted that the Level 1 and Level 2 values may be established in a variety of ways. On the one hand, where a high first pass read rate is desired, Level 1 or Level 2 may be set to certain levels for all symbologies. This setting may be practical for symbologies that are very reliable and are readily decoded and verified (e.g., Code 128). However, with respect to certain symbologies, it may be desirable to require more time to search for the add-on data prior to accepting the label information as valid for further processing. In such case, Level 1 or Level 2 may be set to higher limits for certain symbologies. By setting Level 1 or Level 2 to a lower limit, the highest throughput of all items is enabled, though highest possible add-on capture rate may be adversely affected. Also the relative levels of Level 1 and Level 2 may provide for an efficient read rate. For base data not on the list (add-on codes not expected) Level 1 may be set low (e.g. zero) and for base data on the list (for which add-on data is expected to be associated) Level 2 may be set at a level to provide sufficient extra time to search for add-ons.

Figure 9:
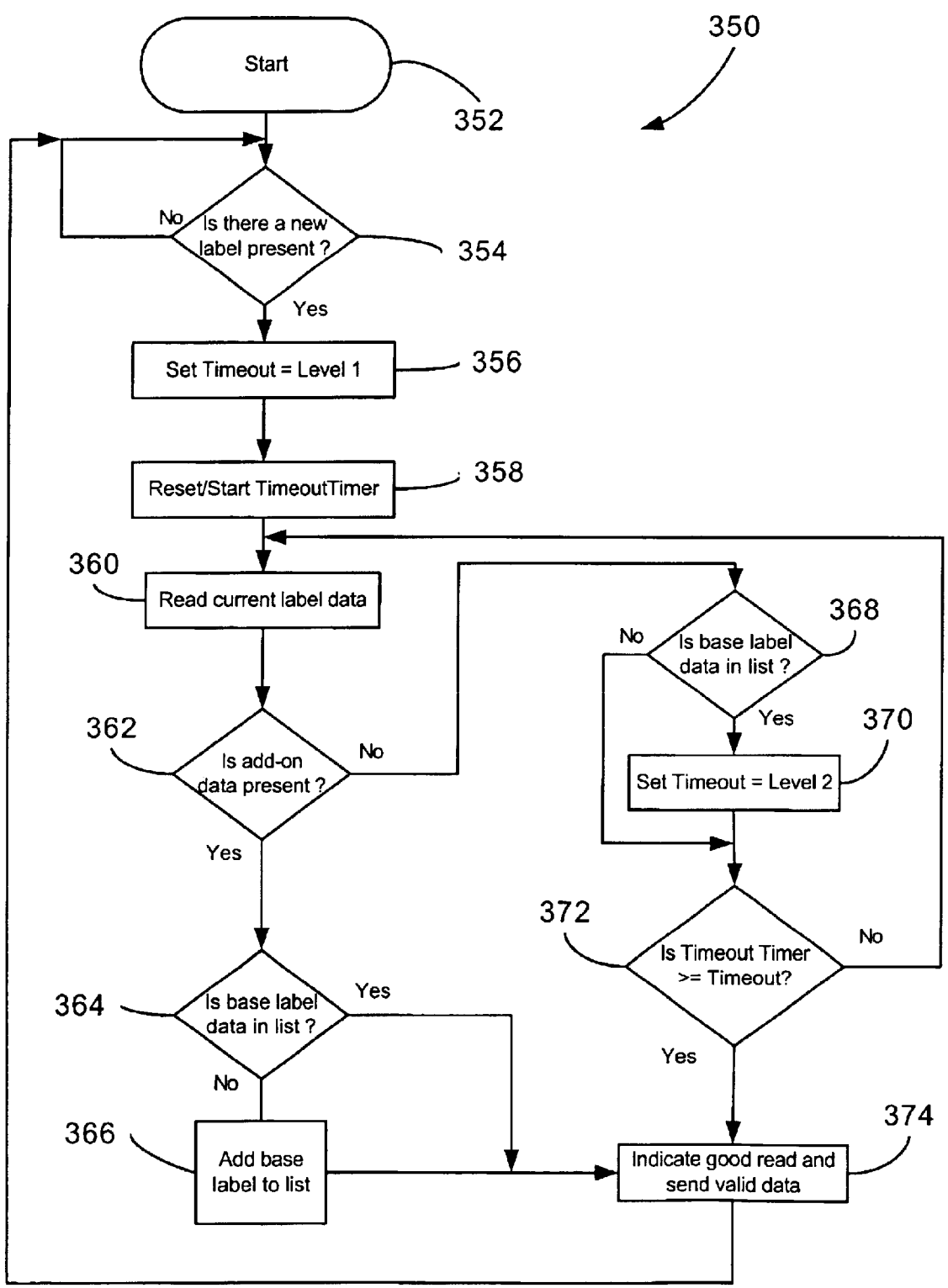
FIG. 9 is a flow diagram of another alternate method for improving add-on capture rate.

FIG. 9 is a flow diagram of an alternate method 350 for improving add-on capture rate using a timeout methodology. Commences at start step 352, the system then determines whether new label information is present at step 354. If "No" the system remains at step 354 and continues to monitor for new label information If new label information is present at step 354, the system sets at step 356 the variable: Timeout to Level 1. The variable Timeout represents the time which will be permitted for the system to detect an add-on code once it has detected a base label, to Level 1. Level 1 may be equal to zero or some higher value depending upon how much additional time the system will be permitted to search for the add-on code. The system then resets or starts the TimeoutTimer (at step 358).

Upon initialization as above, the system then proceeds to begin reading current label data (step 360). This read data may comprise base label data alone and may further comprise possible add-on label data. In this latter regard, the system next checks whether or not add-on label information is present (step 362). If "No" the system proceeds to step 368; if "Yes" the system next checks (at step 364) whether or not the corresponding base label data is already in the list of base labels that have previously been identified as having add-ons associated therewith. Unlike prior systems that require such information to be pre-programmed, the list in accordance with this embodiment is created as label information is read. Accordingly, upon first installing the system 350, the list is empty. As the system 350 is used in operation, base label data is stored in the list only after the first time that add-on data has been associated with it.

If the determination at step 364 is that the base label data is not on the list, then the system proceeds to add the base label data to the list (step 366). Once the base label data is added to the list, or upon a determination at step 364 that the base label data was already on the list, then the system then proceeds to step 374 indicating a good read.

Where an add-on data is not detected, ("No" from step 362) the system again determines at step 368 whether the base label data is in the list. If "No", (i.e., the base label data is not in the list), the system then proceeds to step 372, thus the variable Timeout remains at Level 1. If the determination at step 368 is "Yes", (i.e., the base label data is in the list), the system then proceeds to step 370 where the variable Timeout is set to Level 2 (Level 2 being higher than Level 1) and then to step 372.

The system proceeds to step 372 where it determines whether the Timeout Timer (which started at step 358) has reached the Timeout period. If "No", the system returns to step 360 to continue looking for add-on data; if "Yes" the system proceeds to step 374 indicating a good read. After a good read is indicated, the system resets returning to step 354 looking for a new label.

As in the system 300 of the previous embodiment, the variable Timeout is set at either Level 1 or at the Level 2 based on whether or not the base label is determined to be on the list. Level 2 being higher than Level 1, the system is given a greater time period (as determined at step 372) to continue to search for add-on data when the base label data is on the list.

Figure 10:
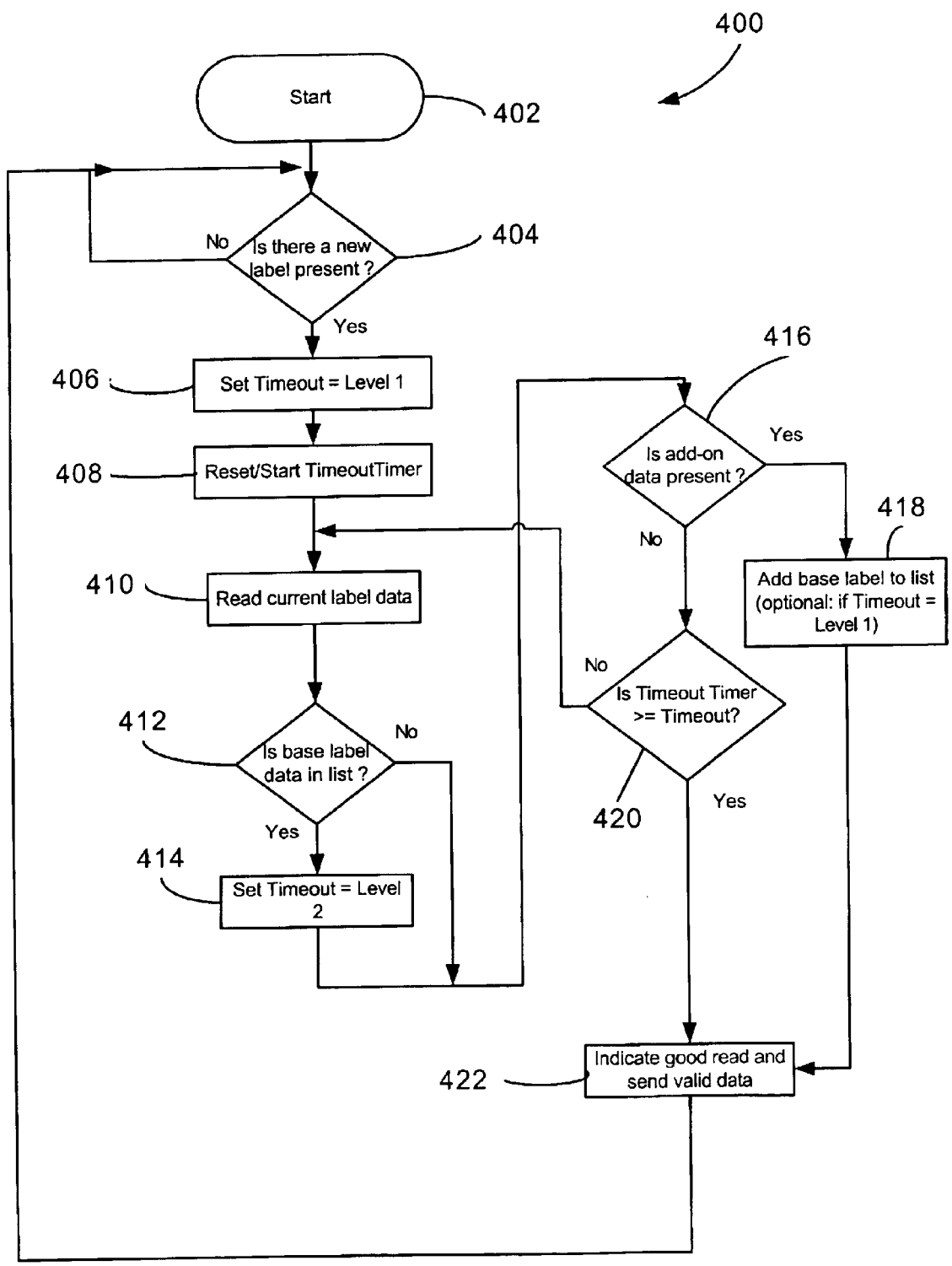
FIG. 10 is a flow diagram of yet another alternate method for improving add-on capture rate.

As may be seen from the previous embodiments, the order and organization of steps may be modified. FIG. 10 is a flow diagram of yet another alternate method 400 in which some of the steps are eliminated yet the system retains its functionality. Commencing at start step 402, the system then determines whether new label information is present at step 404. If "No" the system remains at step 404 and continues to monitor for new label information. If new label information is present at step 404, the system sets at step 406 the variable Timeout to Level 1. The variable Timeout represents the time which will be permitted for the system to detect an add-on code once it has detected a base label, to Level 1. Level 1 may be equal to zero or some higher value depending upon how much additional time the system will be permitted to search for the add-on code. The system then resets or starts the TimeoutTimer (at step 408).

Upon initialization as above, the system then proceeds to begin reading current label data (step 410). This read data may comprise base label data alone and may further comprise possible add-on label data. In this latter regard, the system next checks whether or not the corresponding base label data is already in the list of base labels that have previously been identified as having add-ons associated therewith (step 412). If "No" the system proceeds to step 416; if "Yes" the system sets Timeout to Level 2 (step 414) and then proceeds to step 416.

The system next checks (at step 416) whether or not add-on label information is present (step 416). If "Yes" the base label data is added to the list (at step 418) and then proceeds to step 374 indicating a good read; if "No" the system passes to step 420. At step 420, the system determines whether the Timeout Timer (which started at step 408) has reached the Timeout period. If "No", the system returns to step 410 to continue looking for add-on data; if "Yes" the system proceeds to step 422 indicating a good read. After a good read is indicated, the system resets returning to step 410 looking for a new label.

Step 418 may include the optional step of first determining whether the base label data is on the list and only adding to the list when it is not already on the list. This step may be somewhat time consuming, but since this question has already been determined at step 412, the system need only ask whether Timeout=Level 1 and if "Yes" then add the base label to the list.

As in the system 400 of the previous embodiment, the variable Timeout is set at either Level 1 or at the Level 2 based on whether or not the base label is determined to be on the list. Level 2 being higher than Level 1, the system is given a greater time period (as determined at step 420) to decide whether to continue searching for add-on data.

In the previous embodiments, the system stores a list of base labels for which add-ons have been found to be associated and allow more opportunity to search for add-ons where the base label is found to be in the list by either (1) adjusting MinBaseRead upward (system 100 of FIG. 5) or (2) adjusting Timeout as between Level 1 or Level 2 (as in systems 300, 350 or 400 of FIGS. 8–10). These systems may be combined.

Figure 11:
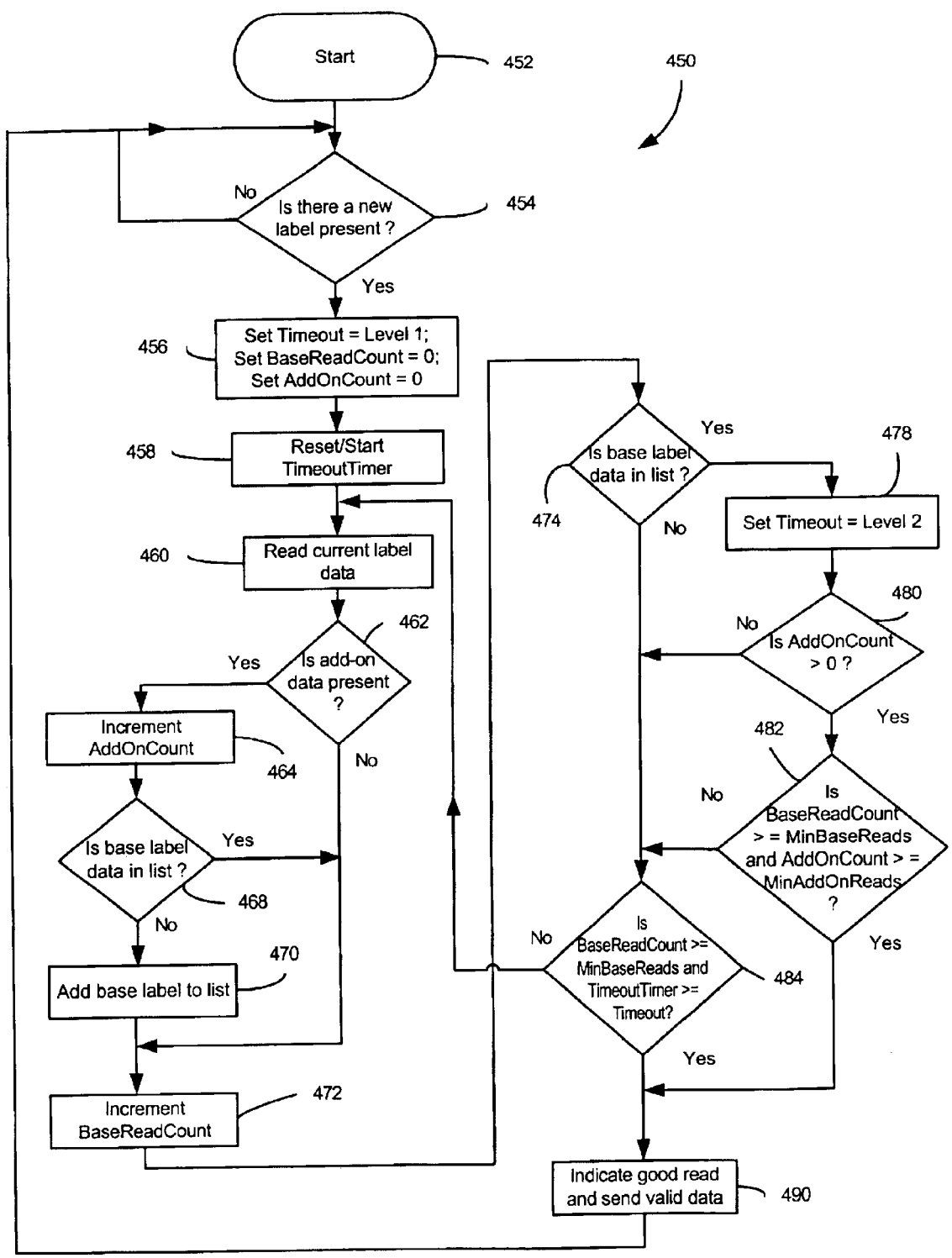
FIG. 11 is a flow diagram of yet another alternate method for improving add-on capture rate.

FIG. 11 illustrates a combined system 450 according to a preferred embodiment. The system starts at step 452, and then determines whether new label information is present (step 454). If "No", the system remains at step 454 and continues to monitor for new label information. If "Yes" new label information is present at step 454, the system proceeds to step 456 initializing the system by setting certain system variable as follows:

Timeout=Level 1, the Timeout representing value for which the system is allowed to continue searching for an add-on data;

BaseReadCount=0, the BaseReadCount representing the number of times a particular set of base label data has been read within a set of label information;

AddOnCount=0, the AddOnCount representing the number of times particular add-on data has been read within a set of label information.

Upon initialization as above, the system then proceeds to step 458 starting TimeoutTimer, and then begins reading current label data (step 460) which may comprise base label data alone and may further comprise possible add-on label data. In this latter regard, the system next checks whether or not add-on label information is present (step 462). If "Yes"

add-on data is present, the system next increments variable AddOnCount (step 464) which keeps track of the number of times the add-on data has been read in relation to a particular set of current label data. As will be further explained hereinbelow, such information may be utilized when more than one read of add-on label data is required to ensure decoding accuracy in relation to particular labels.

Upon incrementing AddOnCount (step 464), the system next checks (step 468) whether or not the corresponding base label data is already in the list of base labels that have previously been identified as having add-ons associated therewith. It is noted that, unlike prior systems that require such information to be pre-programmed, the list in accordance with a preferred system and method is created as label information is read. Accordingly, upon first installing the system of the preferred embodiment, the list is empty. As the system is used in operation, base label data is stored in the list only after the first time that add-on data has been associated with it.

If the determination at step 468 is "No" that the base label data is not on the list, then the system proceeds to add the base label data to the list (step 470). Once the base label data is added to the list, or upon a determination at step 468 that "Yes" the base label data was already on the list, then the system proceeds to increment variable BaseReadCount (step 472) as a means of tracking the number of times the particular base label data has been read. Likewise, if the system determined at step 462 "No" that there was no add-on data present, then the system proceeds directly to step 472 to increment the BaseReadCount in relation to the base label without add-on that is presently being processed.

Upon incrementing BaseReadCount at step 472, the system then proceeds in accordance with the determination as to whether the base label data is in the list at step 474. It may be seen that with respect to non-add-on labels (e.g., as depicted in FIG. 1), the determination at step 474 is the first check regarding whether or not the base label data is in the list and the answer will always be "No" and the system would proceed to verify the label information in accordance with the optimum throughput requirements established for that symbology. With respect to labels which have an add-on, but where the add-on has not been read in the current label data processed to that point, the determination at step 474 would likewise be the first check regarding the base label being in the list. However, where that base label had previously been read with an add-on, the base label data would be in the list and the system would attempt further reads to capture the add-on data as further detailed hereinbelow.

If the determination at step 474 "No" i.e. the base label is not in the list, the system proceeds to step 480. If the determination at step 474 is "Yes", i.e., the base label data is in the list, the system then proceeds to step 478 where Timeout is set to Level 2 (Level 2 being higher than Level 1) and then proceeds to check whether or not AddOnCount is greater than zero (step 480). A "Yes" determination at step 480 is indicated in any of the following situations: 1) base label data and add-on data have both been read for the first time (in which case the base label data was placed on the list in step 470); 2) base label data and add-on data have both been read in the current read of label data, but the base label data had already been placed on the list from reads of a prior label (a "Yes" out of step 468); or, 3) base label data has been read without add-on information (a "No" out of step 462), but that base label data has previously been associated with add-on data from prior reads of the current label.

In the first two situations above, AddOnCount has been incremented at step 472 and, thus, is greater than zero. Since the add-on data has been captured in either of these situations, there is no reason to require additional reads of the base label data over the optimum lower limit established for that symbology. Thus, the system proceeds, at step 482, to determine whether the BaseReadCount is greater than or equal to the value set for MinBaseReads (i.e., the minimum number of times that the base label data must be seen in order to be accepted) in relation to that symbology and (optionally) whether the AddOnCount is greater than or equal to the value set for MinAddOnReads (i.e., the minimum number of times that the add-on label data must be seen in order to be accepted). If "No", the system passes to step 484; if "Yes", the system passes to step 490 indicating a good read and sending valid data.

If at step 480 it is determined "No" that AddOnCount is not greater than zero, the system proceeds to step 484. At step 484 (reached from either a "No" at step 474 or a "No" at step 480), it is determined whether BaseReadCount is greater than or equal to the value set for MinBaseReads (i.e., the minimum number of times that the base label data must be seen in order to be accepted) in relation to that symbology and whether TimeoutTimer is greater than or equal to Timeout (Timeout being either Level 1 if the base label is not in the list or Level 2 if the base label is in the list). If both conditions are met "Yes", the system proceeds to step 490 indicating a good read and sending valid data; if both conditions are not met "No" the system is returned to step 460 to continue reading current label data.

Alternately, the condition at step 484 may be satisfied if either condition is met. (hence the "and/or" set forth in the step 484 box in the figure).

Figure 12:
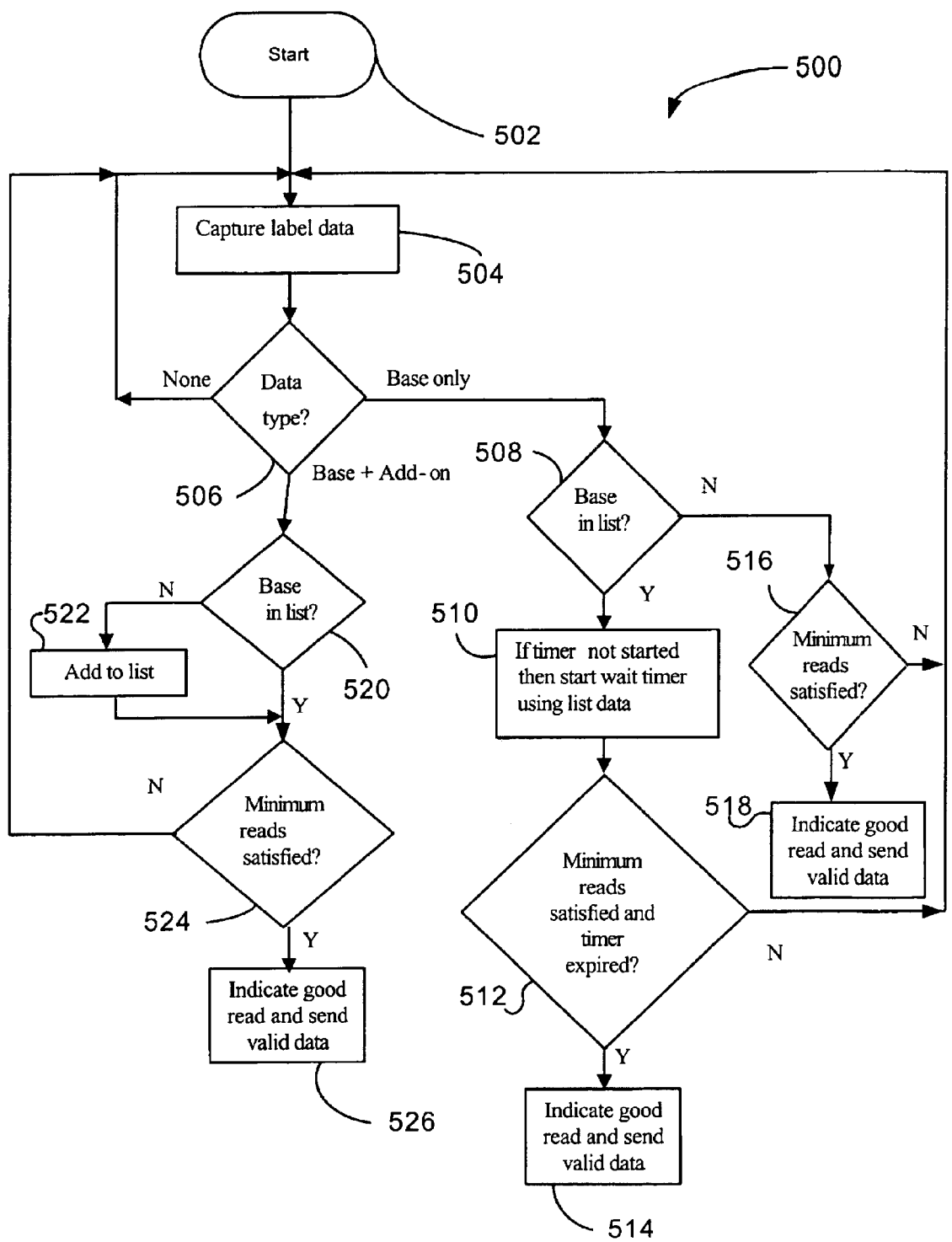
FIG. 12 is a flow diagram of yet another alternate method for improving add-on capture rate.

FIG. 12 is a flow diagram of another combination system 500. The system commences at start 502 and proceeds to capture label data at step 504. Next at step 506, the type of data is determined. If no data is detected, the system continues to search for data, returning to step 504. If only base data is detected, the system proceeds to step 508. If base data and add-on data is detected, the system proceeds to step 520.

At step 520 (where both base data and add-on data have been detected at step 506), the system determines whether the base data detected is in the list. If "Yes" the system passes directly to step 524; if "No" the system adds the base data to the list (step 522) and then passes to step 524. At step 524, the system determines whether the minimum number of reads of the base label data and/or add-on data has been satisfied and if "Yes" proceeds to step 526 where the good read indicator is actuated (e.g. actuating the usual "beep" tone) and sending valid data; and if "No" returns to step 504 to capture additional label data.

At step 508 (where only base data has been detected at step 506), the system determines whether the base data detected is in the list. If "Yes" the system passes to step 510; if "No" the system proceeds to step 516 where the system determines whether the minimum number of reads of the base label data and/or add-on data has been satisfied and if "Yes" proceeds to step 518 where the good read indicator (e.g. "beep") is actuated and sending valid data; and if "No" returns to step 504 to capture additional label data.

Back at step 510 (where the base has been determined to be in the list at step 508), the start wait timer is started, then it is determined (at step 512) whether both conditions have been met: (1) minimum number of reads satisfied and (2) timer expired (or reached the desired level). If "Yes" to both these conditions, the system proceeds to step 514 where the good read indicator (e.g. "beep") is actuated and sending valid data; and if "No" returns to step 504 to capture additional label data.

The above systems may optionally store data as to how long it takes to find add-on data for particular base labels and set Level 2 (or the wait timer of system 500) to a level depending upon a suitable formula based on the history this stored data. Thus for labels for which add-ons are expected, but which are readily found, Level 2 is set at a lower level (though still higher than Level 1) and for labels for which add-ons are expected, but which are not readily found, Level 2 is set at a higher level.

The above systems may optionally store data as to how many reads of base label data it takes to find add-on data for particular base labels and select/adjust AddOnAttemptCount (or the minimum reads of system 500) to a level depending upon a suitable formula based on the history this stored data. Thus for labels for which add-ons are expected, but which are readily found, AddOnAttemptCount is set at a lower level and for labels for which add-ons are expected, but which are not readily found, AddOnAttemptCount is set at a higher level.

Figure 13:
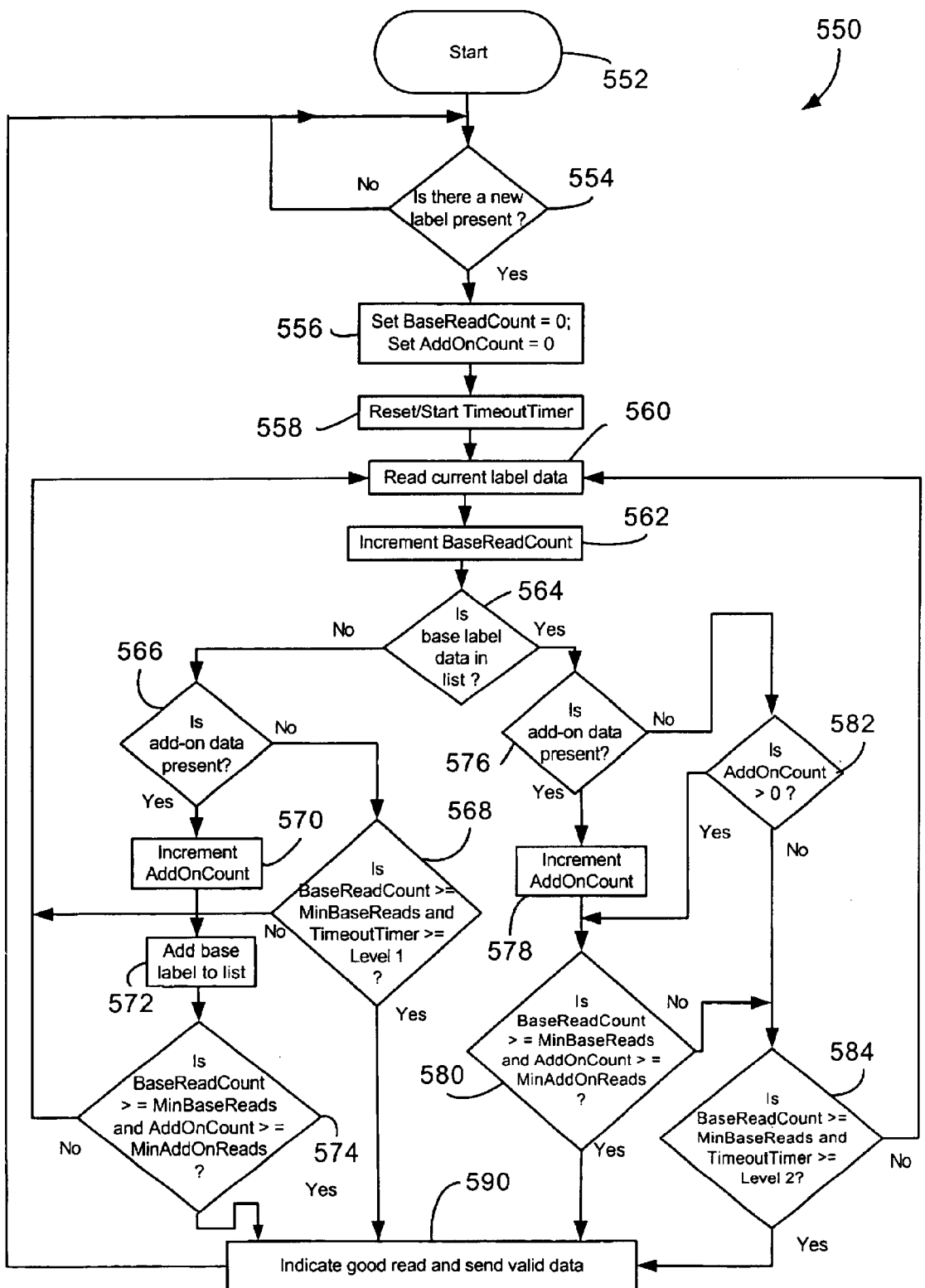
FIG. 13 is a flow diagram of yet another alternate method for improving add-on capture rate.

FIG. 13 is a flow diagram of another combination system 550. The system starts at step 552, and then determines whether new label information is present (step 554). If "No", the system remains at step 554 and continues to monitor for new label information. If "Yes" new label information is present at step 554, the system proceeds to step 556 initializing the system by setting certain system variable as follows:

BaseReadCount=0, the BaseReadCount representing the number of times a particular set of base label data has been read within a set of label information;

AddOnCount=0, the AddOnCount representing the number of times particular add-on data has been read within a set of label information.

Upon initialization as above, the system then proceeds to step 558 starting TimeoutTimer, and then begins reading current label data (step 560) which may comprise base label data alone and may further comprise possible add-on label data. Next, the BaseReadCount is incremented at step 562 and then the system determines whether the base label is in the list (step 564). If "No" the system proceeds to step 566; if "Yes" the system proceeds to step 576. In this latter regard, the system next checks whether or not add-on label information is present (step 562). If "Yes" add-on data is present, the system next increments variable AddOnCount (step 578) which keeps track of the number of times the add-on data has been read in relation to a particular set of current label data. As described above in relation to other embodiments, such information may be utilized when more than one read of add-on label data is required to ensure decoding accuracy in relation to particular labels. Upon incrementing AddOn-Count (step 578), the system proceeds to step 580.

If at step 576 add-on data is determined not present ("No"), the system proceeds to step 582 to check whether or not AddOnCount is greater than zero. If "No" meaning that add-on data has not been detected (as yet) for any of the reads of this new label, the system proceeds to step 584 where it is determined whether BaseReadCount is greater than or equal to the value set for MinBaseReads (i.e., the minimum number of times that the base label data must be seen in order to be accepted) in relation to that symbology and whether TimeoutTimer is greater than or equal to Level 2 (the higher level time period since base label has been determined to be in the list). If both conditions are met "Yes", the system proceeds to step 590 indicating a good read and sending valid data; if both conditions are not met "No" the system is returned to step 560 to continue reading current label data. In an alternate system, only one of the conditions need be satisfied.

If at step 582 AddOnCount is greater than or equal to zero (i.e. add-on data had been detected in a previous read of the current label data), the system proceeds to step 580. At step 580 (via either "Yes" from step 582 or "Yes" from step 576), the system determines whether the BaseReadCount is greater than or equal to the value set for MinBaseReads (i.e., the minimum number of times that the base label data must be seen in order to be accepted) in relation to that symbology and (optionally) whether the AddOnCount is greater than or equal to the value set for MinAddOnReads (i.e., the minimum number of times that the add-on label data must be seen in order to be accepted). If "No", the system passes to step 584; if "Yes", the system passes to step 590 indicating a good read and sending valid data.

Returning to step 566 (reached via "No" from step 564) the system determines whether add-on data is present. If at step 566 add-on data is determined not present ("No"), the system proceeds to step 568 where it is determined whether BaseReadCount is greater than or equal to the value set for MinBaseReads (i.e., the minimum number of times that the base label data must be seen in order to be accepted) in relation to that symbology and whether TimeoutTimer is greater than or equal to Level 1 (the lower level time period since base label has been determined to be not on the list and no add-on has been detected as to the present read). If both conditions are met "Yes", the system proceeds to step 590 indicating a good read and sending valid data; if both conditions are not met "No" the system is returned to step 560 to continue reading current label data. In an alternate system, only one of the conditions need be satisfied.

If at step 566 add-on data is determined to be present ("Yes"), the system next increments variable AddOnCount (step 570) which keeps track of the number of times the add-on data has been read in relation to a particular set of current label data. As described above in relation to other embodiments, such information may be utilized when more than one read of add-on label data is required to ensure decoding accuracy in relation to particular labels. Upon incrementing AddOnCount (step 570), the system proceeds to step 572 where this base label is added to the list (it already having been determined at step 564 that this base label is not already on the list). Next at step 574 the system determines whether the BaseReadCount is greater than or equal to the value set for MinBaseReads (i.e., the minimum number of times that the base label data must be seen in order to be accepted) in relation to that symbology and (optionally) whether the AddOnCount is greater than or equal to the value set for MinAddOnReads (i.e., the minimum number of times that the add-on label data must be seen in order to be accepted). If "No", the system is returned to step 560 to continue reading current label data; if "Yes", the system passes to step 590 indicating a good read and sending valid data.

It should be noted that certain additional steps have not been described with respect to each of the embodiments, but may be readily included therewith. For example, a step of removing a base label from the list (by removing items that have not been scanned for some user-selectable period of time) may be included in any of the above-described preferred embodiments.

As for storing the base label data in the list, it should be noted that the form of the data in the list may be decoded or undecoded, or some other format representative of the item being scanned.

Though the present invention has been set forth in the form of its preferred embodiments, it is nevertheless intended that modifications to the disclosed systems and methods may be made without departing from inventive concepts set forth herein. The scope of the invention is thus not to be limited other than in the spirit of the following claims.

We claim:

1. In a system for reading labels by one or more optical scans, a method of label recognition comprising the steps of:

identifying label data comprising at least base label data;

determining whether the label data further comprises add-on data;

storing base label data for label data determined to comprise both base label data and add-on data in a list, such that the list comprises base label data with respect to which add-on data is expected to be associated; and adjusting a minimum number of reads required for base label data in the list so as to allow for capture of add-on data without sacrificing throughput of base label data without add-on data.

2. A method according to claim 1 wherein the step of storing base label data further comprises the step of storing a type of add-on data expected to be associated with the base label data.

3. A method according to claim 1 wherein the step of storing base label data further comprises the step of storing statistics in relation to the base label data stored.

4. A method according to claim 3 wherein the statistics stored comprise the number of times each base label data in the list has been read.

5. A method according to claim 3 wherein the statistics stored comprise the number of times an add-on has been read in association with each base label data in the list.

6. A system for reading barcode labels wherein some labels include add-on data, comprising:

a processor for identifying label data comprising at least base label data;

means for determining whether the label data further comprises add-on data; and a list store for storing base label data in relation to label data which further comprises add-on data based upon the determination from said determining means wherein data from said list store is utilized with respect to new label scans to adjust a minimum number of reads of base label data in relation to labels in the list store so as to allow for capture of add-on data without sacrificing throughput of base label data without add-on data.

7. In a barcode scanner system, a method of recognizing scanned labels incorporating base label data and add-on. data, comprising the steps of:

associating a first minimum number of required base label data reads with each label to be scanned irrespective of whether add-on data is incorporated;

scanning new labels;

determining which new labels comprise add-on data in association with base label data;

storing label information for each first occurrence of a new label determined to comprise add-on data in association with base label data; and associating a second minimum number of required base label data reads with each label determined to comprise add-on data in association with base label data.

8. A method according to claim 7 wherein the second minimum number of required base label data reads comprises the first minimum number plus an add-on attempt count number.

9. A method according to claim 7 further comprising the steps of:
   obtaining an individual read of at least base label data from a scanned new label;
   identifying whether label information has been stored in relation to the base label data read; and
   systematically requiring additional reads of at least base label data from a scanned new label such that reads comprising base label data only are obtained the first minimum number of read times for base label data for which label information is not identified as stored and the second minimum number of read times for base label data for which label information has been identified as stored.

10. In a barcode scanner system, a method of recognizing scanned labels incorporating base label data and add-on data, comprising the steps of:
   associating a first minimum number of required base label data reads with each label to be scanned irrespective of whether add-on data is incorporated;
   scanning new labels;
   determining which new labels comprise add-on data in association with base label data;
   storing label information for each first occurrence of a new label determined to comprise add-on data in association with base label data;
   associating a second minimum number of required base label data reads with each label determined to comprise add-on data in association with base label data;
   obtaining an individual read of at least base label data from a scanned new label;
   identifying whether label information has been stored in relation to the base label data read;
   systematically requiring additional reads of at least base label data from a scanned new label such that reads comprising base label data only are obtained the first minimum number of read times for base label data for which label information is not identified as stored and the second minimum number of read times for base label data for which label information has been identified as stored;
   associating a minimum number of required add-on data reads with each stored label information;
   identifying add-on data associated with base label data in the individual read obtained;
   accepting scanned new labels after the second number of required base label data reads and,the minimum number of required add-on data reads where the scanned new labels are determined to comprise add-on data in association with base label data;
   accepting scanned new labels after the second number of required base label data reads where label information is identified as stored in relation to the base label data while-add-on data has not been identified in association with base label data in the individual reads obtained; and
   accepting scanned new labels after the first number of required base label data reads where label information is not stored in relation to base label data and add-on data has not been identified in association with base label data in the individual reads obtained.

11. In a barcode scanner system, a system for recognizing scanned labels incorporating base label and add-on data comprising:
   a decoder for providing reads of label information comprising base label data and label information comprising both base label data and add-on data;
   learning means for identifying and storing label information associated with reads of label information comprising base label data and add-on data; and,
   a processor for adjusting minimum base label data read requirements based upon identified and stored information from said learning means such that a higher number of minimum reads is associated with base label data corresponding to identified and stored information from said learning means than with other base label data.

12. The system of claim 11 wherein said learning means further comprises non-volatile memory storage means for storing information regarding base label data associated with reads of label information comprising base label data and add-on data.

13. The system of claim 11 wherein said learning means further comprises Random Access Memory storage means for storing information regarding base label data associated with reads of label information comprising base label data and add-on data.

14. The system of claim 11 wherein the information stored by said learning means includes base label data and add-on data.

15. The system of claim 14 wherein the information stored by said learning means further includes total base reads and total add-on reads.

16. The system of claim 15 wherein said processor further adjusts minimum base label data read requirements based upon statistics obtained from stored information from said learning means.

17. The system of claim 15 wherein said processor further adjusts add-on data read requirements based upon statistics obtained from stored information from said learning means.

18. The system of claim 15 wherein stored information from said learning means is modified based upon statistics obtained from the stored information.

19. In a barcode scanner system, a method for recognizing scanned labels incorporating base label data and add-on data without sacrificing throughput with respect to scanned labels incorporating base label data without add-on data comprising the steps of:
   obtaining reads of decoded label information comprising only base label data and decoded label information comprising both base label data and add-on data;
   learning which base label data from the obtained reads of decoded label information is associated with add-on data-and storing label information associated with-reads of label information comprising both base label data and add-on data; and,
   systematically adjusting minimum base label data read requirements based upon learned and stored label information such that a higher number of minimum reads is associated with base label data corresponding to identified and stored information from said learning means than with other base label data.

20. A method according to claim 19 wherein the information stored includes base label data and add-on type label data.

21. A method according to claim 19 wherein the information stored includes total base reads and total add-on reads.

22. A method according to claim 21 further comprising the step of adjusting minimum base label data read requirements based upon statistics obtained from information stored.

23. A method according to claim 21 further comprising the step of adjusting add-on data read requirements based upon statistics obtained from information stored.

24. A method according to claim 21 further comprising the step of modifying stored information based upon statistics obtained from the stored information.

25. In a system for reading labels by one or more optical scans, a method of label recognition comprising the steps of:

formulating a list of base label data for which add-on data is expected to be associated;

identifying label data comprising at least base label data;

determining whether the base label data identified is in the list;

setting a first minimum number of reads required for base label data determined not to be in the list;

setting a second minimum number of reads, greater than the first minimum number, required for base label data determined to be in the list.

26. A method according to claim 25 further comprising the steps of determining whether the label data further comprises add-on data;

if the label data further comprises add-on data and if the base label data is determined not to be in the list, adding the base label data to the list.

27. A method according to claim 25 further comprising the steps of determining whether the label data further comprises add-on data;

if the label data does not comprise add-on data and if the base label data is determined to be in the list, removing the base label data from the list if the base label data has not been scanned for a selected period of time.

28. In a system for reading labels by one or more optical scans, a method of label recognition comprising the steps of:

formulating a list of base label data for which add-on data is expected to be associated;

identifying label data comprising at least base label data;

determining whether the base label data identified is in the list;

requiring a greater number of minimum reads for base label data determined to be in the list than for base label data determined to not be in the list.

29. In a system for reading labels by one or more optical scans, a method of label recognition comprising the steps of:

formulating a list of base label data for which add-on data is expected to be associated;

identifying label data comprising at least base label data;

determining whether the base label data identified is in the list;

if the base label data is determined not to be in the list, setting a first timeout to allow continued searching for add-on data;

if the base label data is determined to be in the list, setting a second timeout, greater than the first timeout, to allow continued searching for add-on data.

30. A method according to claim 29 further comprising the steps of determining whether the label data further comprises add-on data;

if the label data further comprises add-on data and if the base label data is determined not to be in the list, adding the base label data to the list.

31. A method according to claim 29 further comprising the step of removing a base label from the list.

32. A method according to claim 31 wherein said base label is removed from the list if the base label has not been scanned for a selected period of time.

33. In a system for reading labels by one or more optical scans, a method of label recognition comprising the steps of:

formulating a list of base label data for which add-on data is expected to be associated;

identifying label data comprising at least base label data;

determining whether the base label data identified is in the list;

setting a greater timeout for continued searching of add-on data where the base label data is determined to be in the list than where the base label data is determined to not be in the list.

34. A method according to claim 33 further comprising the steps of determining whether the label data further comprises add-on data;

if the label data further comprises add-on data and if the base label data is determined not to be in the list, adding the base label data to the list.

* * * * *

UNITED STATES PATENT AND TRADEMARK OFFICE
CERTIFICATE OF CORRECTION

PATENT NO.     : 6,729,603 B1
DATED          : May 4, 2004
INVENTOR(S)    : Alexander M. McQueen, Craig D. Cherry and Randy J. Turkal It is certified that error appears in the above-identified patent and that said Letters Patent is hereby corrected as shown below:

Column 1,
Line 26, change "fight" to -- light --.

Column 5,
Line 41, change "scanners" to -- scanner's --.

Column 14,
Line 46, change "maybe" to -- may be --.

Column 16,
Line 49, change "Total," to -- Total --;
Line 58, change "wilt" to -- will --.

Column 21,
Line 67, change "information" to -- information. --.

Column 28,
Line 49, change "add-on." to -- add-on --.

Column 29,
Line 57, replace "while-add-on data" with -- while add-on data --.

Column 30,
Line 49, change "data-and" to -- data and --.
Lines 49-50, change "with-reads" to -- with reads --.

Signed and Sealed this

Sixteenth Day of August, 2005

JON W. DUDAS
*Director of the United States Patent and Trademark Office*